(12) United States Patent
Lu et al.

(10) Patent No.: US 12,174,348 B2
(45) Date of Patent: Dec. 24, 2024

(54) OPTICAL IMAGING LENS ASSEMBLY

(71) Applicant: ZHEJIANG SUNNY OPTICS CO., LTD., Zhejiang (CN)

(72) Inventors: Jia Lu, Zhejiang (CN); Binqing Wang, Zhejiang (CN); Meng Yang, Zhejiang (CN); Fujian Dai, Zhejiang (CN); Liefeng Zhao, Zhejiang (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 621 days.

(21) Appl. No.: 17/411,079

(22) Filed: Aug. 25, 2021

(65) Prior Publication Data

US 2022/0082803 A1   Mar. 17, 2022

(30) Foreign Application Priority Data

Sep. 17, 2020   (CN) .......................... 202010979628.6

(51) Int. Cl.
*G02B 13/00* (2006.01)
*G02B 9/64* (2006.01)
*G02B 27/00* (2006.01)

(52) U.S. Cl.
CPC ........... *G02B 13/0045* (2013.01); *G02B 9/64* (2013.01); *G02B 27/0025* (2013.01)

(58) Field of Classification Search
CPC .... G02B 13/04; G02B 13/06; G02B 13/0045; G02B 13/18; G02B 9/64; G02B 27/0025; G02B 15/143105; G02B 15/144105; G02B 15/144113; G02B 15/145105; G02B 15/145121; G02B 15/145113; G02B 15/145129; G02B 15/1461; G02B 15/173; G02B 15/28
USPC .......................... 359/708, 690, 687, 681, 750
See application file for complete search history.

(56) References Cited

U.S. PATENT DOCUMENTS

2019/0285972 A1*  9/2019  Minefuji ............... G03B 21/142
2021/0356723 A1* 11/2021  Kitada ................... G02B 13/18

FOREIGN PATENT DOCUMENTS

CN         208026983 U  * 10/2018  ........... G02B 13/005
JP         2018092185 A *  6/2018  ........... G02B 15/173
WO    WO-2004095109 A1 * 11/2004  ............. G02B 21/02
WO    WO-2012169154 A1 * 12/2012  ........... G02B 15/173

* cited by examiner

*Primary Examiner* — Nicholas R. Pasko
*Assistant Examiner* — Samanvitha Sridhar
(74) *Attorney, Agent, or Firm* — Samson G. Yu

(57) ABSTRACT

The disclosure provide an optical imaging lens assembly, which sequentially includes from an object side to an image side along an optical axis: a first lens, a second lens, a third lens, a fourth lens, a fifth lens, a sixth lens, a seventh lens, an eighth lens, a ninth lens and a tenth lens having refractive powers respectively; wherein the first lens, the third lens and the ninth lens have positive refractive powers respectively; the second lens and the tenth lens have negative refractive powers respectively; and f is a total effective focal length of the optical imaging lens assembly, and EPD is an entrance pupil diameter of the optical imaging lens assembly, f and EPD satisfy: f/EPD<1.5.

18 Claims, 12 Drawing Sheets longitudinal aberration curve

OPTICAL IMAGING LENS ASSEMBLY

CROSS-REFERENCE TO RELATED APPLICATION(S)

The disclosure claims priority to Chinese Patent Application No. 202010979628.6, filed on Sep. 17, 2020 and entitled "Optical imaging lens assembly", the contents of which are hereby incorporated by reference in its entirety.

TECHNICAL FIELD

The disclosure relates to the field of optical elements, and particularly relates to an optical imaging lens assembly.

BACKGROUND

In recent years, a camera function of smart phones has been increasingly powerful, so people prefer to use smart phones to shoot pictures and videos to record daily life. Therefore, a smart phone with a powerful camera function is essential for people at home and travel. As a result, in order to meet the market requirements of the smart phones and to develop a wider market, various mobile phone manufacturers put forward more requirements on the mobile phone lenses.

An ultrathin lens with a large aperture, a large image surface, a wide angle, a small head, etc. is widely favored by numerous mobile phone developers. However, in the design of the optical lens, the aperture increase means the throughput increase as well as the larger signal-to-noise ratio, but the larger signal-to-noise ratio is not conducive to improvement on the imaging quality of the optical imaging lens assembly. Therefore, how to endow the optical imaging lens assembly with a large aperture, a large image surface, etc. under the condition of high imaging quality is one of the problems urgently to be solved by optical lens designers at present.

SUMMARY

Some embodiments of the disclosure provide such an optical imaging lens assembly. The optical imaging lens assembly sequentially includes from an object side to an image side along an optical axis: a first lens, a second lens, a third lens, a fourth lens, a fifth lens, a sixth lens, a seventh lens, an eighth lens, a ninth lens and a tenth lens having refractive powers respectively; the first lens, the third lens and the ninth lens have positive refractive powers respectively; the second lens and the tenth lens have negative refractive powers respectively; and f is a total effective focal length of the optical imaging lens assembly and EPD is an entrance pupil diameter of the optical imaging lens assembly may satisfy: f/EPD<1.5.

In one implementation mode, at least one surface from the object-side surface of the first lens to the image-side surface of the tenth lens is an aspheric mirror surface.

In one implementation mode, f1 is an effective focal length of the first lens, and f3 is an effective focal length of the third lens, f1 and f3 may satisfy: $0.7<f1/f3*10<3.7$.

In one implementation mode, f7 is an effective focal length of the seventh lens, R13 is a curvature radius of an object-side surface of the seventh lens, and R14 is a curvature radius of an image-side surface of the seventh lens, R13 and R14 may satisfy: $0.5<f7/(R14-R13)<3.3$.

In one implementation mode, f9 is an effective focal length of the ninth lens, and R17 is a curvature radius of an object-side surface of the ninth lens, f9 and R17 may satisfy: $1.0<f9/R17<1.5$.

In one implementation mode, f8 is an effective focal length of the eighth lens, and f10 is an effective focal length of the tenth lens, f8 and f10 may satisfy: $2.8<f8/f10<5.3$.

In one implementation mode, CT9 is a center thickness of the ninth lens on the optical axis, and CT7 is a center thickness of the seventh lens on the optical axis, CT9 and CT7 may satisfy: $1.2<CT9/CT7<1.7$.

In one implementation mode, T910 is a spacing distance between the ninth lens and the tenth lens on the optical axis, and T45 is a spacing distance between the fourth lens and the fifth lens on the optical axis, T910 and T45 may satisfy: $2.0<T910/T45<2.6$.

In one implementation mode, f12 is a combined focal length of the first lens and the second lens, and f is a total effective focal length of the optical imaging lens assembly, f12 and f may satisfy: $2.0<f12/f<2.5$.

In one implementation mode, f1234 is a combined focal length of the first lens, the second lens, the third lens and the fourth lens, CT1 is a center thickness of the first lens on the optical axis, CT2 is a center thickness of the second lens on the optical axis, CT3 is a center thickness of the third lens on the optical axis, and CT4 is a center thickness of the fourth lens on the optical axis, f1234, CT1, CT2, CT3 and CT4 may satisfy: $5.0<f1234/(CT1+CT2+CT3+CT4)<7.0$.

In one implementation mode, f78 is a combined focal length of the seventh lens and the eighth lens, and f56 is a combined focal length of the fifth lens and the sixth lens, f78 and f56 may satisfy: $-1.5<f78/f56<-0.3$.

In one implementation mode, SAG31 is a distance from an intersection point of an object-side surface of the third lens and the optical axis to an effective radius vertex of the object-side surface of the third lens on the optical axis, and SAG41 is a distance from an intersection point of an object-side surface of the fourth lens and the optical axis to an effective radius vertex of the object-side surface of the fourth lens on the optical axis, SAG31 and SAG41 may satisfy: $1.2<SAG31/SAG41<1.6$.

In one implementation mode, f is a total effective focal length of the optical imaging lens assembly and FOV is a maximum field of view of the optical imaging lens assembly, f and FOV may satisfy: $4.5 \text{ mm}<f*\tan(FOV/2)<7.0 \text{ mm}$.

In one implementation mode, a spacing distance is provided on the optical axis between any two adjacent lenses from the first lens to the tenth lens.

In one implementation mode, an object-side surface of the third lens is a convex surface, and an image-side surface may be a concave surface; and an object-side surface of the fourth lens is a convex surface, and an image-side surface may be a concave surface.

Some other embodiments of the disclosure provide an optical imaging lens assembly. The optical imaging lens assembly sequentially includes from an object side to an image side along an optical axis: a first lens, a second lens, a third lens, a fourth lens, a fifth lens, a sixth lens, a seventh lens, an eighth lens, a ninth lens and a tenth lens having refractive powers respectively; the first lens, the third lens and the ninth lens have positive refractive powers respectively; the second lens and the tenth lens have negative refractive powers respectively; and f is a total effective focal length of the optical imaging lens assembly and FOV is a maximum field of view of the optical imaging lens assembly, f and FOV may satisfy: $4.5 \text{ mm}<f*\tan(FOV/2)<7.0 \text{ mm}$.

In one implementation mode, f1 is an effective focal length of the first lens and f3 is an effective focal length of the third lens, f1 and f3 may satisfy: $0.7<f1/f3*10<3.7$.

In one implementation mode, f7 is an effective focal length of the seventh lens, R13 is a curvature radius of an object-side surface of the seventh lens, and R14 is a curvature radius of an image-side surface of the seventh lens, f7, R13 and R14 may satisfy: $0.5<f7/(R14-R13)<3.3$.

In one implementation mode, f9 is an effective focal length of the ninth lens, and R17 is a curvature radius of an object-side surface of the ninth lens, f9 and R17 may satisfy: $1.0<f9/R17<1.5$.

In one implementation mode, f8 is an effective focal length of the eighth lens, and f10 is an effective focal length of the tenth lens, f8 and f10 may satisfy: $2.8<f8/f10<5.3$.

In one implementation mode, CT9 is a center thickness of the ninth lens on the optical axis, and CT7 is a center thickness of the seventh lens on the optical axis, CT9 and CT7 may satisfy: $1.2<CT9/CT7<1.7$.

In one implementation mode, T910 is a spacing distance between the ninth lens and the tenth lens on the optical axis, and T45 is a spacing distance between the fourth lens and the fifth lens on the optical axis, T910 and T45 may satisfy: $2.0<T910/T45<2.6$.

In one implementation mode, f12 is a combined focal length of the first lens and the second lens, and f is a total effective focal length of the optical imaging lens assembly, f12 and f may satisfy: $2.0<f12/f<2.5$.

In one implementation mode, f1234 is a combined focal length of the first lens, the second lens, the third lens and the fourth lens, CT1 is a center thickness of the first lens on the optical axis, CT2 is a center thickness of the second lens on the optical axis, CT3 is a center thickness of the third lens on the optical axis, and CT4 is a center thickness of the fourth lens on the optical axis, f1234, CT1, CT2, CT3 and CT4 may satisfy: $5.0<f1234/(CT1+CT2+CT3+CT4)<7.0$.

In one implementation mode, f78 is a combined focal length of the seventh lens and the eighth lens and f56 is a combined focal length of the fifth lens and the sixth lens, f78 and f56 may satisfy: $-1.5<f78/f56<-0.3$.

In one implementation mode, SAG31 is a distance from an intersection point of an object-side surface of the third lens and the optical axis to an effective radius vertex of the object-side surface of the third lens on the optical axis, and SAG41 is a distance from an intersection point of an object-side surface of the fourth lens and the optical axis to an effective radius vertex of the object-side surface of the fourth lens on the optical axis, SAG31 and SAG41 may satisfy: $1.2<SAG31/SAG41<1.6$.

In one implementation mode, f is a total effective focal length of the optical imaging lens assembly and EPD is an entrance pupil diameter of the optical imaging lens assembly, f and EPD may satisfy: $f/EPD<1.5$.

In one implementation mode, a spacing distance is provided on the optical axis between any two adjacent lenses from the first lens to the tenth lens.

In one implementation mode, an object-side surface of the third lens is a convex surface, and an image-side surface may be a concave surface; and an object-side surface of the fourth lens is a convex surface, and an image-side surface may be a concave surface.

By rationally distributing the refractive power and optimizing optical parameters, the disclosure provides the optical imaging lens assembly which is applicable to portable electronic products and has at least one of the beneficial effects of ultrathin, large aperture, large image surface, wide angle, good imaging quality, etc.

BRIEF DESCRIPTION OF THE DRAWINGS

Other features, objectives, and advantages of the disclosure will become more apparent by reading the detailed description on non-limiting embodiments made with reference to the following accompanying drawings.

DETAILED DESCRIPTION OF THE EMBODIMENTS

Figure 1:
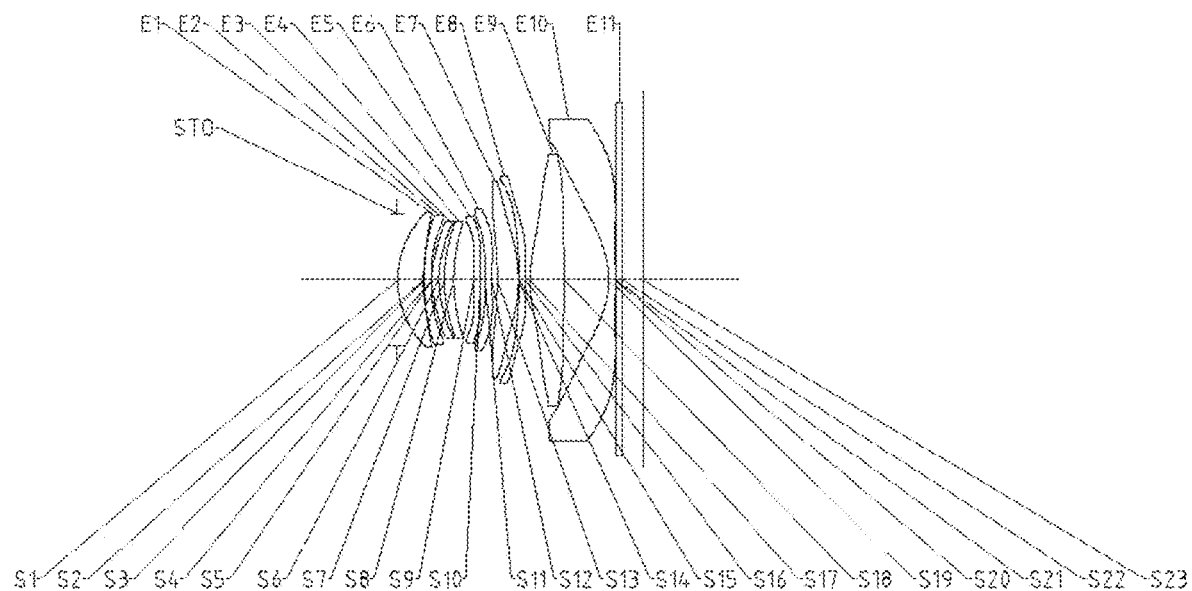
FIG. 1 illustrates a structural schematic diagram of an optical imaging lens assembly according to Embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or an aspheric shape shown in the drawings is shown by some embodiments. That is, the spherical shape or the aspheric shape is not limited to the spherical shape or the aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if the lens surface is a concave surface and a position of the concave surface is not defined, it indicates that the lens surface is a concave surface at least in the paraxial region. A surface of each lens closest to an object-side is called an object-side surface of the lens, and a surface of each lens closest to an imaging surface is called an image-side surface of the lens.

It also should be understood that terms "include", "including", "have", "contain" and/or "containing", used in this description, represent existence of a stated feature, component and/or part but do not exclude existence or addition of one or more other features, components and parts and/or combinations thereof. In addition, expressions like "at least one in . . . " may appear after a list of listed features not to modify an individual component in the list but to modify the listed features. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by the general technical personnel in the field of the disclosure. It should also be understood that terms (for example, terms defined in commonly used dictionaries) should be interpreted as having a meaning that is consistent with their meaning in the context of the relevant art and will not be interpreted in an idealized or overly formalized sense unless expressly so defined herein.

It should be noted that the embodiments in the disclosure and features in the embodiments can be combined without conflicts. The disclosure will be described below with reference to the drawings and in combination with the embodiments in detail.

The features, principles and other aspects of the disclosure will be described below in detail.

The optical imaging lens assembly according to the exemplary implementation mode of the disclosure may include ten lenses having refractive powers, which are a first lens, a second lens, a third lens, a fourth lens, a fifth lens, a sixth lens, a seventh lens, an eighth lens, a ninth lens and a tenth lens. These ten lenses are sequentially arranged from an object side to an image side along an optical axis. A spacing distance may be provided between any two adjacent lenses from the first lens to the tenth lens.

In an exemplary implementation mode, the first lens may have a positive refractive power, the second lens may have a negative refractive power, the third lens may have a positive refractive power, the fourth lens may have a positive refractive power or negative refractive power, the fifth lens may have a positive refractive power or negative refractive power, the sixth lens may have a positive refractive power or negative refractive power, the seventh lens may have a positive refractive power or negative refractive power, the eighth lens may have a positive refractive power or negative refractive power, the ninth lens may have a positive refractive power, and the tenth lens may have a negative refractive power.

In an exemplary implementation mode, the first lens with the positive refractive power may converge light; the second lens with the negative refractive power and the third lens with the positive refractive power are carried, which may reasonably distribute the refractive power of the optical imaging lens assembly, the refractive power of the optical imaging lens assembly is prevented from being excessively concentrated on one lens, so edge light has a good convergence effect on an imaging surface, a coma aberration of the optical imaging lens assembly is reduced, and the optical imaging lens assembly has better imaging quality. The ninth lens with the positive refractive power carries the tenth lens with the negative refractive power, and accordingly, a field curvature of the optical imaging lens assembly is reduced, a dispersion of the optical imaging lens assembly is reduced, and a phenomenon of field curvature staggering is improved.

In an exemplary implementation mode, the optical imaging lens assembly according to the disclosure may satisfy: f/EPD<1.5, wherein f is a total effective focal length of the optical imaging lens assembly, and EPD is an entrance pupil diameter of the optical imaging lens assembly. f/EPD<1.5 is satisfied, such that an aberration of an edge field of view may be prevented from being too large while an aperture of the imaging lens is enlarged, and the imaging lens may have the features of wide imaging range, high imaging quality, etc.

In an exemplary implementation mode, the optical imaging lens assembly according to the disclosure may satisfy: $0.7<f1/f3*10<3.7$, wherein f1 is an effective focal length of the first lens, and f3 is an effective focal length of the third lens. $0.7<f1/f3*10<3.7$ is satisfied, such that a size of the optical imaging lens assembly may be effectively reduced, the refractive power of the optical imaging lens assembly may be prevented from being excessively concentrated on a certain lens, an spherical aberration contribution of the first lens and the third lens may be controlled within a reasonable range, and accordingly, the optical imaging lens assembly may obtain better imaging quality.

In an exemplary implementation mode, the optical imaging lens assembly according to the disclosure may satisfy: $0.5<f7/(R14-R13)<3.3$, wherein f7 is an effective focal length of the seventh lens, R13 is a curvature radius of the object-side surface of the seventh lens, and R14 is a curvature radius of the image-side surface of the seventh lens. $0.5<f7/(R14-R13)<3.3$ is satisfied, such that a lens structure of the seventh lens is favorably restrained, and moreover, a chromatic aberration of the lens is favorably reduced.

In an exemplary implementation mode, the optical imaging lens assembly according to the disclosure may satisfy: $1.0<f9/R17<1.5$, wherein f9 is an effective focal length of the ninth lens, and R17 is a curvature radius of the object-side surface of the ninth lens. More particularly, f9 and R17 may further satisfy: $1.1<f9/R17<1.4$. $1.0<f9/R17<1.5$ is satisfied, such that machining and forming of the ninth lens are facilitated, sensitivity of the ninth lens is reduced, and stray light at a tail end of the lens can be reduced by setting a shape of the ninth lens.

In an exemplary implementation mode, the optical imaging lens assembly according to the disclosure may satisfy: $2.8<f8/f10<5.3$, wherein f8 is an effective focal length of the eighth lens, and f10 is an effective focal length of the tenth lens. $2.8<f8/f10<5.3$ is satisfied, such that a refractive power of the lens may be prevented from being excessively concentrated on the eighth lens, sensitivity of the tenth lens may be reduced, and the optical imaging lens assembly has better machining feasibility.

In an exemplary implementation mode, the optical imaging lens assembly according to the disclosure may satisfy: $1.2<CT9/CT7<1.7$, wherein CT9 is a center thickness of the ninth lens on the optical axis, and CT7 is a center thickness of the seventh lens on the optical axis. $1.2<CT9/CT7<1.7$ is satisfied, such that the distortion amount of the lens may be effectively reduced, and a ghost image risk caused by light internal reflection may be reduced.

In an exemplary implementation mode, the optical imaging lens assembly according to the disclosure may satisfy: $2.0 < T910/T45 < 2.6$, wherein T910 is a spacing distance between the ninth lens and the tenth lens on the optical axis, and T45 is a spacing distance between the fourth lens and the fifth lens on the optical axis. $2.0 < T910/T45 < 2.6$ is satisfied, such that miniaturization is facilitated, and the ghost image risk caused by the object-side surface of the fourth lens is reduced.

By matching the spacing distance between the fourth lens and the fifth lens on the optical axis, the chromatic aberration of the lens may be effectively reduced, the machining and assembling features of the lens may be ensured, and meanwhile, light deflection may be retarded, the field curvature of the imaging lens may be adjusted, and the sensitivity of the imaging lens may be reduced, so the production yield is improved.

In an exemplary implementation mode, the optical imaging lens assembly according to the disclosure may satisfy: $2.0 < f12/f < 2.5$, wherein f12 is a combined focal length of the first lens and the second lens, and f is the total effective focal length of the optical imaging lens assembly. More particularly, f12 and f may further satisfy: $2.2 < f12/f < 2.5$. $2.0 < f12/f < 2.5$ is satisfied, such that the size of the lens may be effectively reduced, the refractive power of the lens is prevented from being excessively concentrated on the first lens and the second lens, and the spherical aberration contribution of the first lens and the second lens may be controlled within a reasonable range, so the lens may obtain better resolving power.

In an exemplary implementation mode, the optical imaging lens assembly according to the disclosure may satisfy: $5.0 < f1234/(CT1+CT2+CT3+CT4) < 7.0$, wherein f1234 is a combined focal length of the first lens, the second lens, the third lens, and the fourth lens, CT1 is a center thickness of the first lens on the optical axis, CT2 is a center thickness of the second lens on the optical axis, CT3 is a center thickness of the third lens on the optical axis, and CT4 is a center thickness of the fourth lens on the optical axis. More specifically, f1234, CT1, CT2, CT3, and CT4 may further satisfy: $5.6 < f1234/(CT1+CT2+CT3+CT4) < 6.6$. $5.0 < f1234/(CT1+CT2+CT3+CT4) < 7.0$ is satisfied, such that shapes of the first lens, the second lens, the third lens and the fourth lens may be restrained, by reasonable distributing the refractive power of the first lens, the second lens, the third lens and the fourth lens, the spherical aberration and chromatic aberration of the lens may be reduced by restraining the refractive power of the front four lenses, and the lens has good imaging performance.

In an exemplary implementation mode, the optical imaging lens assembly according to the disclosure may satisfy: $-1.5 < f78/f56 < -0.3$, wherein f78 is a combined focal length of the seventh lens and the eighth lens, and f56 is a combined focal length of the fifth lens and the sixth lens. More particularly, f78 and f56 may further satisfy: $-1.4 < f78/f56 < -0.3$. $-1.5 < f78/f56 < -0.3$ is satisfied, such that the refractive power of each lens may be reasonably distributed, and the aberration of the lens may be reduced.

In an exemplary implementation mode, the optical imaging lens assembly set according to the disclosure may satisfy: $1.2 < SAG31/SAG41 < 1.6$, wherein SAG31 is a distance from an intersection point of the object-side surface of the third lens and the optical axis to an effective radius vertex of the object-side surface of the third lens on the optical axis, and SAG41 is a distance from an intersection point of the object-side surface of the fourth lens and the optical axis to an effective radius vertex of the object-side surface of the fourth lens on the optical axis. More particularly, SAG31 and SAG41 may further satisfy: $1.3 < SAG31/SAG41 < 1.5$. $1.2 < SAG31/SAG41 < 1.6$ is satisfied, such that shapes of the third lens and the fourth lens may be controlled, the field curvature of the lens may be reduced, and the medium-thickness gap sensitivity of the third lens and the fourth lens may be reduced.

In an exemplary implementation mode, the optical imaging lens assembly according to the disclosure may satisfy: $4.5\ mm < f*\tan(FOV/2) < 7.0\ mm$, wherein f is a total effective focal length of the optical imaging lens assembly, and FOV is a maximum field of view of the optical imaging lens assembly. More specifically, f and FOV may further satisfy: $4.7\ mm < f*\tan(FOV/2) < 5.6\ mm$. $4.5\ mm < f*\tan(FOV/2) < 7.0\ mm$ is satisfied, such that an aperture size of the lens is favorably controlled, the lens meets certain imaging parameter requirements, then a size of the lens is reduced to a certain extent, and the sensitivity of the lens is reduced.

In an exemplary implementation mode, a spacing distance may be provided between any two adjacent lenses from the first lens to the tenth lens on the optical axis, such that the imaging lens may be better formed and assembled.

In an exemplary implementation mode, an object-side surface of the third lens may be a convex surface and an image-side surface may be a concave surface. The object-side surface of the fourth lens may be a convex surface, and the image-side surface may be a concave surface. The third lens with the convex and concave surface types matches the fourth lens with the convex and concave surface types, such that the chromatic aberration of the lens is reduced, and the spherical aberration and the coma aberration of the lens are reduced.

In an exemplary implementation mode, the optical imaging lens assembly according to the disclosure further includes a diaphragm disposed between the object side and the first lens. Optionally, the optical imaging lens assembly may further include an optical filter used for correcting color deviation. And the optical imaging lens assembly group may further include a protective glass used for protecting a photosensitive element located on the imaging surface. The disclosure provides an optical imaging lens assembly which has features of ultrathin, large aperture, large image surface, wide angle, small head, long focus, high imaging quality, etc. The optical imaging lens assembly according to the above implementation modes of the disclosure may employ a plurality of lenses, for example, ten lenses described above. By reasonably distributing the refractive power of each lens, the surface types, the center thickness of each lens, the on-axis distance between the lenses, etc., incident light may be effectively converged, a total optical length of the imaging lens is reduced, the machinability of the imaging lens is improved, and accordingly, the optical imaging lens assembly is more easy to produce and machine.

In the implementation mode of the disclosure, at least one of the mirror surfaces of each lens is an aspheric mirror surface, that is, at least one mirror surface from the object-side surface of the first lens to the image-side surface of the tenth lens is an aspheric mirror surface. The aspheric lens has the features that the curvature varies continuously from a center of the lens to a periphery of the lens. Different from a spherical lens having a constant curvature from the center of the lens to the periphery of the lens, the aspheric lens has a better feature of a curvature radius and has the advantages of improving distortion aberration and astigmatism aberration. After the aspheric lens is used, aberration occurring during imaging may be eliminated as much as possible, thereby improving the imaging quality. Optionally, at least one of the object-side surface and the image-side surface of each of the first lens, the second lens, the third lens, the fourth lens, the fifth lens, the sixth lens, the seventh lens, the eighth lens, the ninth lens and the tenth lens is the aspheric mirror surface. Optionally, the object-side surface and the image-side surface of each of the first lens, the second lens, the third lens, the fourth lens, the fifth lens, the sixth lens, the seventh lens, the eighth lens, the ninth lens and the tenth lens are the aspheric mirror surfaces.

However, it should be understood by those skilled in the art that the number of lenses constituting the optical imaging lens assembly may be varied to obtain various results and advantages described in this specification without departing from the claimed technical solution. For example, although described with ten lenses as an example in an implementation mode, the optical imaging lens assembly is not limited to including ten lenses. The optical imaging lens assembly may also include other numbers of lenses if desired.

Specific embodiments of the optical imaging lens assembly that may be suitable for use in the above implementation mode are described further below with reference to the accompanying drawings.

Embodiment 1

An optical imaging lens assembly according to Embodiment 1 of the disclosure is described below with reference to FIG. 1 to FIG. 2C. FIG. 1 shows a structural schematic diagram of an optical imaging lens assembly according to Embodiment 1 of the disclosure.

As shown in FIG. 1, the optical imaging lens assembly sequentially includes from an object side to an image side: a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging surface S23.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a concave surface. The sixth lens E6 has a negative refractive power, an object-side surface S11 thereof is a convex surface, and an image-side surface S12 thereof is a concave surface. The seventh lens E7 has a positive refractive power, an object-side surface S13 thereof is a concave surface, and an image-side surface S14 thereof is a convex surface. The eighth lens E8 has a negative refractive power, an object-side surface S15 thereof is a concave surface, and an image-side surface S16 thereof is a concave surface. The ninth lens E9 has a positive refractive power, an object-side surface S17 thereof is a convex surface, and an image-side surface S18 thereof is a convex surface. The tenth lens E10 has a negative refractive power, an object-side surface S19 thereof is a concave surface, and an image-side surface S20 thereof is a convex surface. The optical filter E11 has an object-side surface 821 and an image-side surface S22. Light from an object sequentially passes through each of the surfaces from S1 to S22 and is finally imaged on the imaging surface S23.

Table 1 illustrates a table of basic parameters of the optical imaging lens assembly of Embodiment 1, wherein the units of the curvature radius, thickness/distance, and focal length are all millimeters (mm).

TABLE 1

| Surface number | Surface type | Curvature radius | Thickness/ distance | Refractive index | Abbe number | Focal length | Conic coefficient |
|---|---|---|---|---|---|---|---|
| OBJ | Spherical | Infinity | Infinity | | | | |
| STO | Spherical | Infinity | 0.0200 | | | | |
| S1 | Aspheric | 2.9483 | 0.8108 | 1.55 | 53.7 | 10.89 | 0.0000 |
| S2 | Aspheric | 5.2495 | 0.0376 | | | | 0.0000 |
| S3 | Aspheric | 23.0677 | 0.2100 | 1.66 | 19.5 | −62.74 | 0.0000 |
| S4 | Aspheric | 14.8305 | 0.0200 | | | | 0.0000 |
| S5 | Aspheric | 2.7128 | 0.2110 | 1.67 | 19.1 | 144.57 | 0.0000 |
| S6 | Aspheric | 2.7029 | 0.1787 | | | | 0.0000 |
| S7 | Aspheric | 4.6344 | 0.2980 | 1.59 | 32.4 | 35.43 | 0.0000 |
| S8 | Aspheric | 5.8159 | 0.6510 | | | | 0.0000 |
| S9 | Aspheric | 35.3871 | 0.2100 | 1.66 | 20.1 | 56.06 | 0.0000 |
| S10 | Aspheric | 783.8958 | 0.1452 | | | | 0.0000 |
| S11 | Aspheric | 163.0492 | 0.2100 | 1.58 | 29.7 | −14.92 | 0.0000 |
| S12 | Aspheric | 8.3225 | 0.1776 | | | | 0.0000 |
| S13 | Aspheric | −15.7916 | 0.6732 | 1.60 | 28.8 | 9.38 | 0.0000 |
| S14 | Aspheric | −4.2321 | 0.0200 | | | | 0.0000 |
| S15 | Aspheric | −9.5197 | 0.2100 | 1.60 | 28.3 | −15.08 | 0.0000 |
| S16 | Aspheric | 221.4168 | 0.1351 | | | | 0.0000 |
| S17 | Aspheric | 4.0934 | 1.0812 | 1.64 | 21.6 | 5.19 | −1.0000 |
| S18 | Aspheric | −16.9626 | 1.3952 | | | | 0.0000 |
| S19 | Aspheric | −3.0351 | 0.2100 | 1.63 | 22.1 | −5.32 | −1.0000 |
| S20 | Aspheric | −29.1744 | 0.0216 | | | | 0.0000 |
| S21 | Spherical | Infinity | 0.2100 | 1.52 | 64.2 | | |
| S22 | Spherical | Infinity | 0.6400 | | | | |
| S23 | Spherical | Infinity | | | | | |

In this embodiment, f is a total effective focal length of the optical imaging lens assembly, f equals 5.44 mm, TTL is a total length of the optical imaging lens assembly, (that is, a distance from an object-side surface S1 of the first lens E1 to the imaging surface 823 on the optical axis) TTL equals 7.76 mm, and ImgH is a half of a diagonal length of an effective pixel region on the imaging surface S23, ImgH equals 4.77 mm.

In Embodiment 1, both of the object-side surface and the image-side surface of any one of the first lens E1 to the tenth lens E10 are aspheric surfaces, and the surface type x of each aspheric lens may be defined by, but is not limited to, the following aspheric formula:

$$x = \frac{ch^2}{1 + \sqrt{1 - (k+1)c^2h^2}} + \Sigma A_i h^i, \quad (1)$$

wherein x is a vector height of a distance between the aspheric surface and a vertex of the aspheric surface when the aspheric surface is located at a position with the height h in the optical axis direction; c is a paraxial curvature of the aspheric surface, c=1/R (that is, the paraxial curvature c is an inverse of radius of curvature R in Table 1 above); k is a conic coefficient; and Ai is a correction coefficient of the i-th order of the aspheric surface. Table 2 below gives higher order term coefficients $A_4$, $A_6$, $A_8$, $A_{10}$, $A_{12}$, $A_{14}$, and $A_{16}$ that may be used for each of the aspheric mirror surfaces S1-S20 in Embodiment 1.

Embodiment 2

Figure 3:
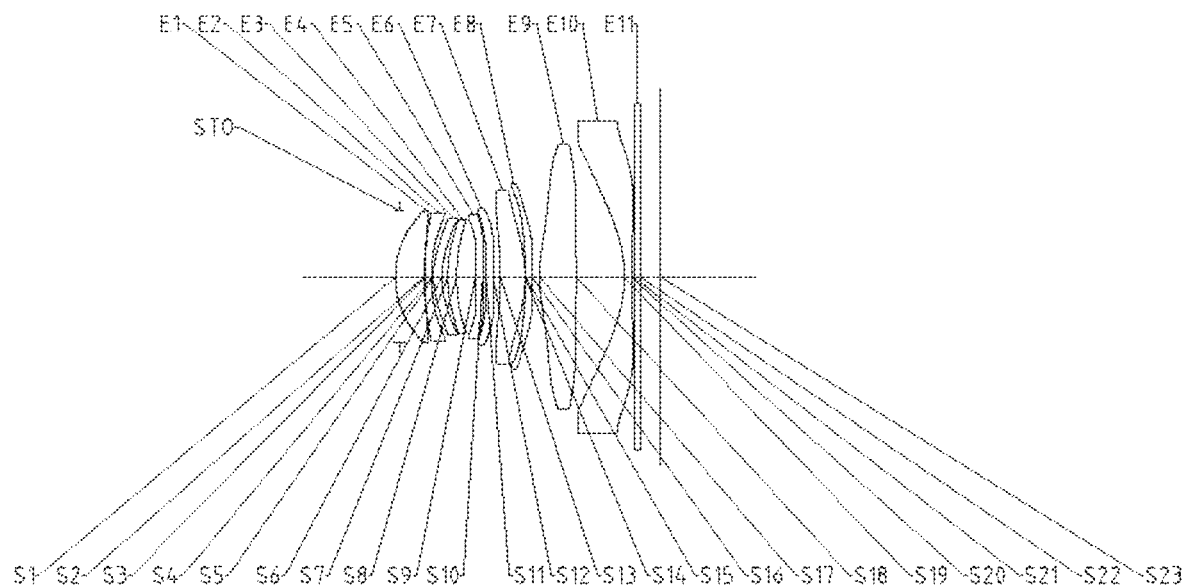
FIG. 3 illustrates a structural schematic diagram of an optical imaging lens assembly according to Embodiment 2 of the disclosure.

An optical imaging lens assembly according to Embodiment 2 of the disclosure is described below with reference to FIG. 3 to FIG. 4C. In the present embodiment and the following embodiment, the description similar to that of Embodiment 1 will be partially omitted for the sake of brevity. FIG. 3 shows a structural schematic diagram of an optical imaging lens assembly according to Embodiment 2 of the disclosure.

As shown in FIG. 3, the optical imaging lens assembly sequentially includes from an object side to an image side: a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging surface S23.

The first lens E1 has a positive refractive power, an object-side surface S1 thereof is a convex surface, and an image-side surface S2 thereof is a concave surface. The second lens E2 has a negative refractive power, an object-side surface S3 thereof is a concave surface, and an image-side surface S4 thereof is a concave surface. The third lens E3 has a positive refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a concave surface. The fifth lens E5 has a positive refractive power, an object-side surface S9 thereof is a convex surface,

TABLE 2

| Surface number | A4 | A6 | A8 | A10 | A12 | A14 | A16 |
|---|---|---|---|---|---|---|---|
| S1 | −1.6310E−02 | 3.0927E−02 | −2.4131E−02 | 9.4162E−03 | −1.9399E−03 | 2.0209E−04 | −8.3969E−06 |
| S2 | −3.2704E−02 | 2.4159E−02 | −1.3979E−02 | 5.0118E−03 | −1.0555E−03 | 1.2005E−04 | −5.7071E−06 |
| S3 | 3.3150E−02 | −5.2322E−04 | −6.2926E−03 | 2.5608E−03 | −4.2343E−04 | 2.7599E−05 | −2.5914E−07 |
| S4 | 6.1968E−02 | −2.4229E−02 | 9.6301E−03 | −4.5505E−03 | 1.4370E−03 | −2.3778E−04 | 1.5789E−05 |
| S5 | −3.6767E−02 | 4.4621E−02 | 5.3353E−03 | −3.9643E−03 | 1.4655E−03 | −2.6774E−04 | 1.8916E−05 |
| S6 | −4.0399E−02 | 1.2306E−02 | −9.8646E−03 | 5.4675E−03 | −1.6357E−03 | 2.7948E−04 | −2.0749E−05 |
| S7 | 4.6038E−03 | −2.2607E−03 | 4.3657E−04 | −1.5137E−03 | 8.7427E−04 | −1.9063E−04 | 1.5562E−05 |
| S8 | 2.2862E−03 | 1.6807E−03 | −7.8777E−04 | −6.5536E−04 | 4.9400E−04 | −1.2465E−04 | 1.2063E−05 |
| S9 | 3.8249E−04 | −1.7235E−02 | 6.0005E−03 | −3.6223E−03 | 1.6356E−03 | −3.3366E−04 | 2.6137E−05 |
| S10 | 4.7716E−03 | −1.4124E−02 | 4.1170E−03 | −1.5664E−03 | 5.6716E−04 | −9.5335E−05 | 6.1208E−06 |
| S11 | −3.5119E−02 | −4.9550E−03 | 1.1726E−02 | −4.9506E−03 | 8.4044E−04 | −4.4920E−05 | −9.8841E−07 |
| S12 | −5.2164E−02 | 8.0237E−03 | 1.3910E−03 | −7.9037E−04 | 3.0825E−05 | 1.9651E−05 | −1.8788E−06 |
| S13 | −1.0422E−02 | 4.2191E−03 | −4.2614E−04 | −2.4872E−05 | 9.2485E−06 | −7.5409E−07 | 2.0633E−08 |
| S14 | 1.8484E−03 | 3.4940E−03 | −1.1460E−03 | 2.4306E−04 | −2.9110E−05 | 1.7169E−06 | −3.8873E−08 |
| S15 | 1.5549E−02 | −7.7553E−03 | 2.2376E−03 | −3.8702E−04 | 3.7428E−05 | −1.8801E−06 | 3.8612E−08 |
| S16 | −1.7859E−02 | −3.9767E−03 | 2.5915E−03 | −4.9386E−04 | 4.6539E−05 | −2.2079E−06 | 4.2034E−08 |
| S17 | −2.0906E−02 | 2.7404E−03 | −2.6807E−04 | 1.9725E−05 | −9.6938E−07 | 2.7670E−08 | −3.4361E−10 |
| S18 | 9.3641E−03 | −1.7323E−03 | 1.8724E−04 | −1.3262E−05 | 5.7288E−07 | −1.3287E−08 | 1.2592E−10 |
| S19 | −4.4455E−03 | 3.3062E−03 | −4.6611E−04 | 3.2470E−05 | −1.1485E−06 | 1.6793E−08 | −2.3244E−11 |
| S20 | 9.4631E−03 | −1.8584E−03 | 1.7151E−04 | −9.4268E−06 | 3.0183E−07 | −5.1357E−09 | 3.5776E−11 |

Figure 2A:
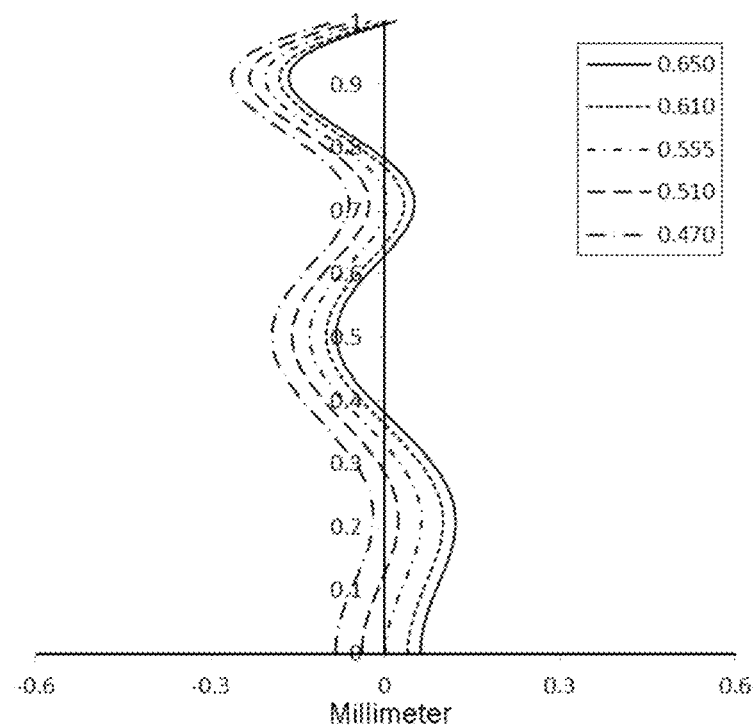
FIGS. 2A-2C illustrate a longitudinal aberration curve, an astigmatism curve and a distortion curve of the optical imaging lens assembly in Embodiment 1 respectively.
Figure 2B:
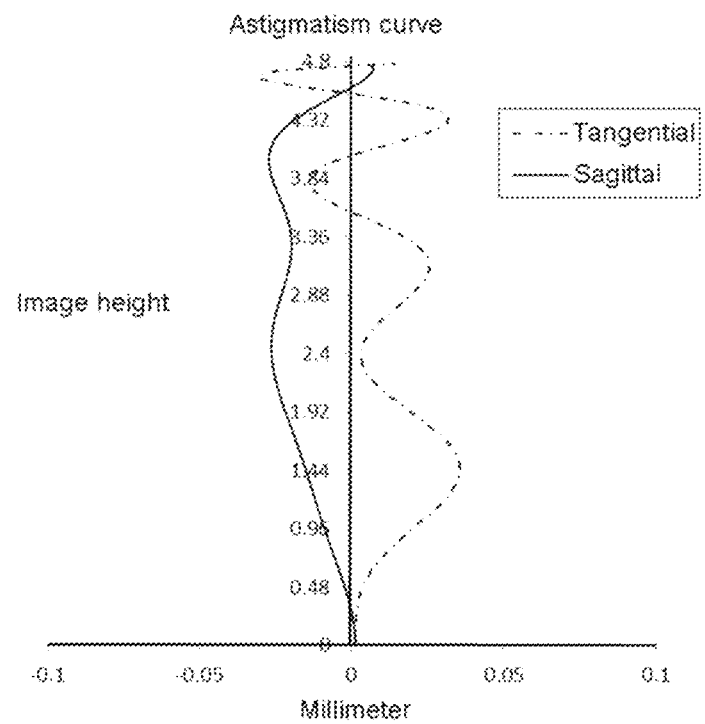
Figure 2C:
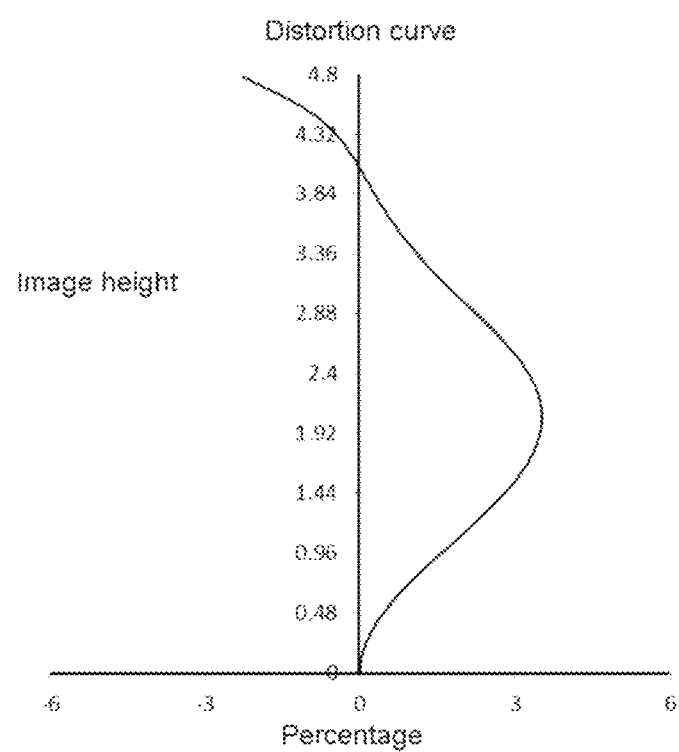

FIG. 2A illustrates a longitudinal aberration curve of the optical imaging lens assembly in Embodiment 1, which represents that a convergence focus of light rays of different wavelengths is deviated after the light rays pass through the lens. FIG. 2B illustrates an astigmatism curve of the optical imaging lens assembly of Embodiment 1, which represents a curvature of tangential image surface and a curvature of sagittal image surface. FIG. 2C illustrates a distortion curve of the optical imaging lens assembly of Embodiment 1, which represents distortion magnitude values corresponding to different image heights. FIG. 2A to FIG. 2C illustrate that the optical imaging lens assembly provided in Embodiment 1 is capable of achieving good imaging quality.

and an image-side surface S10 thereof is a concave surface. The sixth lens E6 has a negative refractive power, an object-side surface S11 thereof is a convex surface, and an image-side surface S12 thereof is a concave surface. The seventh lens E7 has a positive refractive power, an object-side surface S13 thereof is a concave surface, and an image-side surface S14 thereof is a convex surface. The eighth lens E8 has a negative refractive power, an object-side surface S15 thereof is a concave surface, and an image-side surface S16 thereof is a concave surface. The ninth lens E9 has a positive refractive power, an object-side surface S17 thereof is a convex surface, and an image-side surface S18 thereof is a convex surface. The tenth lens E10 has a negative refractive power, an object-side surface S19 thereof is a concave surface, and an image-side surface S20 thereof is a concave surface. The optical filter E11 has an object-side surface S21 and an image-side surface S22. Light from an object sequentially passes through each of the surfaces from S1 to S22 and is finally imaged on the imaging surface S23.

In this embodiment, f is a total effective focal length of the optical imaging lens assembly, f equals 6.17 mm, TTL is a total length of the optical imaging lens assembly, TTL equals 8.41 mm, and ImgH is a half of a diagonal length of an effective pixel region on the imaging surface S23, ImgH equals 5.68 mm.

Table 3 illustrates a table of basic parameters of the optical imaging lens assembly of Embodiment 2, wherein the units of the curvature radius, thickness/distance, and focal length are all millimeters (mm). Table 4 illustrates high order term coefficients applicable to various aspheric mirror surfaces in Embodiment 2, wherein types of various aspheric surfaces may be defined by the formula (1) provided in above-mentioned Embodiment 1.

TABLE 3

| Surface number | Surface type | Curvature radius | Thickness/ distance | Material Refractive index | Abbe number | Focal length | Conic coefficient |
|---|---|---|---|---|---|---|---|
| OBJ | Spherical | Infinity | Infinity | | | | |
| STO | Spherical | Infinity | −0.1320 | | | | |
| S1 | Aspheric | 2.9063 | 0.9093 | 1.54 | 55.7 | 8.30 | 0.0000 |
| S2 | Aspheric | 7.1914 | 0.0405 | | | | 0.0000 |
| S3 | Aspheric | −83.5766 | 0.2101 | 1.67 | 19.1 | −17.06 | 0.0000 |
| S4 | Aspheric | 13.3591 | 0.0441 | | | | 0.0000 |
| S5 | Aspheric | 2.5158 | 0.2656 | 1.67 | 19.0 | 99.15 | 0.0000 |
| S6 | Aspheric | 2.5025 | 0.1887 | | | | 0.0000 |
| S7 | Aspheric | 4.5018 | 0.2809 | 1.55 | 47.8 | 34.93 | 0.0000 |
| S8 | Aspheric | 5.7319 | 0.5938 | | | | 0.0000 |
| S9 | Aspheric | 28.9136 | 0.2376 | 1.67 | 19.0 | 130.61 | 0.0000 |
| S10 | Aspheric | 42.8580 | 0.1034 | | | | 0.0000 |
| S11 | Aspheric | 35.7468 | 0.2218 | 1.57 | 38.7 | −21.05 | 0.0000 |
| S12 | Aspheric | 8.9428 | 0.2280 | | | | 0.0000 |
| S13 | Aspheric | −17.8174 | 0.7900 | 1.55 | 50.1 | 10.12 | 0.0000 |
| S14 | Aspheric | −4.3220 | 0.0208 | | | | 0.0000 |
| S15 | Aspheric | −8.7311 | 0.2106 | 1.58 | 35.4 | −14.71 | 0.0000 |
| S16 | Aspheric | 352.1061 | 0.2246 | | | | 0.0000 |
| S17 | Aspheric | 4.5269 | 1.1697 | 1.63 | 23.2 | 5.91 | 0.0000 |
| S18 | Aspheric | −19.4842 | 1.5321 | | | | 0.0000 |
| S19 | Aspheric | −3.7753 | 0.2100 | 1.64 | 21.4 | −5.06 | 0.0000 |
| S20 | Aspheric | 25.9048 | 0.0830 | | | | 0.0000 |
| S21 | Spherical | Infinity | 0.2100 | 1.52 | 64.2 | | |
| S22 | Spherical | Infinity | 0.6400 | | | | |
| S23 | Spherical | Infinity | | | | | |

TABLE 4

| Surface number | A4 | A6 | A8 | A10 | A12 |
|---|---|---|---|---|---|
| S1 | −2.6088E−04 | 7.8592E−04 | −5.9378E−04 | 2.2702E−04 | −3.5587E−05 |
| S2 | −3.4831E−02 | 2.7511E−02 | −1.7289E−02 | 7.0453E−03 | −1.8105E−03 |
| S3 | 3.5515E−02 | −4.0725E−04 | −9.3142E−03 | 5.5454E−03 | −2.0297E−03 |
| S4 | 5.9280E−02 | −2.2383E−02 | 9.4192E−03 | −5.1398E−03 | 1.7429E−03 |
| S5 | −3.9465E−02 | 4.6923E−04 | 6.1036E−03 | −4.7727E−03 | 1.8581E−03 |
| S6 | −3.7853E−02 | 8.1172E−03 | −6.8896E−03 | 4.2478E−03 | −1.5709E−03 |
| S7 | 6.2241E−03 | −7.4330E−03 | 7.7427E−03 | −7.9000E−03 | 4.4657E−03 |
| S8 | 5.3697E−03 | −3.1464E−03 | 4.4139E−03 | −4.2098E−03 | 2.1418E−03 |
| S9 | −1.0185E−03 | −1.1114E−02 | −2.6855E−03 | 2.6394E−03 | −9.8696E−04 |
| S10 | 5.4991E−03 | −1.2373E−02 | −2.5546E−04 | 2.7255E−03 | −1.6693E−03 |
| S11 | −3.8901E−02 | 1.1730E−03 | 3.9062E−03 | 2.3771E−03 | −3.5113E−03 |
| S12 | −4.6092E−02 | −5.4556E−04 | 1.0729E−02 | −7.5908E−03 | 3.2613E−03 |
| S13 | −1.0163E−02 | 3.9703E−03 | −5.9374E−04 | 2.1633E−04 | −1.0204E−04 |
| S14 | 1.3786E−03 | 3.9482E−03 | −1.1220E−03 | 1.5095E−04 | 4.2916E−06 |
| S15 | 1.9311E−02 | −1.1017E−02 | 3.5725E−03 | −6.5271E−04 | 5.1121E−05 |
| S16 | −1.8224E−02 | −3.0720E−03 | 1.8620E−03 | −1.5344E−04 | −5.1607E−05 |
| S17 | −2.1067E−02 | 2.8276E−03 | −2.7044E−04 | 1.9352E−05 | −9.4245E−07 |
| S18 | 1.1480E−02 | −2.4220E−03 | 2.7929E−04 | −2.0725E−05 | 9.4104E−07 |
| S19 | 9.2248E−03 | −2.0152E−03 | 2.9774E−04 | −2.4603E−05 | 1.1362E−06 |
| S20 | 1.2198E−03 | −7.0216E−04 | 3.5311E−05 | 4.2130E−06 | −8.1714E−07 |

TABLE 4-continued

| Surface number | A14 | A16 | A18 | A20 |
|---|---|---|---|---|
| S1 | 1.8630E−09 | 5.9370E−07 | −5.4209E−08 | 1.1666E−09 |
| S2 | 2.9106E−04 | −2.9100E−05 | 1.8034E−06 | −6.1565E−08 |
| S3 | 5.7971E−04 | −1.2061E−04 | 1.4988E−05 | −8.0242E−07 |
| S4 | −2.6076E−04 | −1.6678E−07 | 3.6984E−06 | −2.1552E−07 |
| S5 | −4.1217E−04 | 5.8505E−05 | −6.5430E−06 | 4.6499E−07 |
| S6 | 4.4631E−04 | −9.7151E−05 | 1.4755E−05 | −1.1285E−06 |
| S7 | −1.4496E−03 | 2.7503E−04 | −2.7915E−05 | 1.1403E−06 |
| S8 | −6.8499E−04 | 1.5106E−04 | −2.1937E−05 | 1.5688E−06 |
| S9 | 3.8076E−04 | −1.1471E−04 | 1.9803E−05 | −1.4140E−06 |
| S10 | 5.6988E−04 | −1.0603E−04 | 9.7898E−06 | −3.3279E−07 |
| S11 | 1.5270E−03 | −3.3658E−04 | 3.9066E−05 | −1.9159E−06 |
| S12 | −9.5295E−04 | 1.7577E−04 | −1.7930E−05 | 7.6674E−07 |
| S13 | 2.6337E−05 | −3.6967E−06 | 2.7165E−07 | −8.2284E−09 |
| S14 | −4.1722E−06 | 5.2431E−07 | −2.7823E−08 | 5.5352E−10 |
| S15 | 2.3717E−06 | −8.6648E−07 | 7.2083E−08 | −2.1764E−09 |
| S16 | 1.5134E−05 | −1.7821E−06 | 1.0479E−07 | −2.5298E−09 |
| S17 | 2.7100E−08 | −3.3663E−10 | −3.0781E−13 | 5.6177E−15 |
| S18 | −2.2987E−08 | 2.1860E−10 | 6.1765E−13 | −9.0467E−15 |
| S19 | −2.7755E−08 | 2.9093E−10 | −5.3171E−13 | 4.8803E−15 |
| S20 | 6.1660E−08 | −2.5073E−09 | 5.3992E−11 | −4.8374E−13 |

Figure 4A:
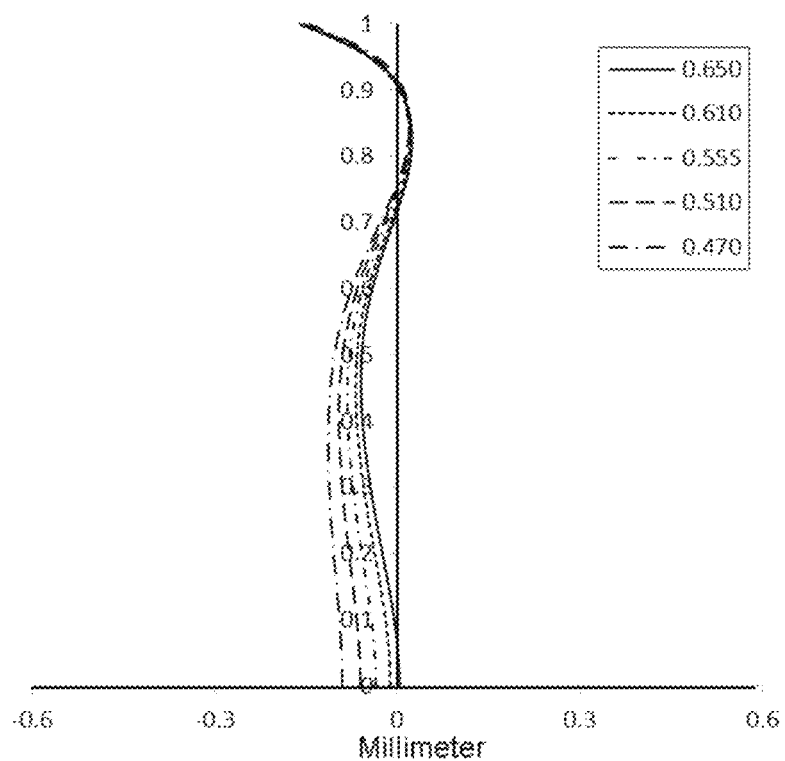
FIGS. 4A-4C illustrate a longitudinal aberration curve, an astigmatism curve and a distortion curve of the optical imaging lens assembly in Embodiment 2 respectively.
Figure 4B:
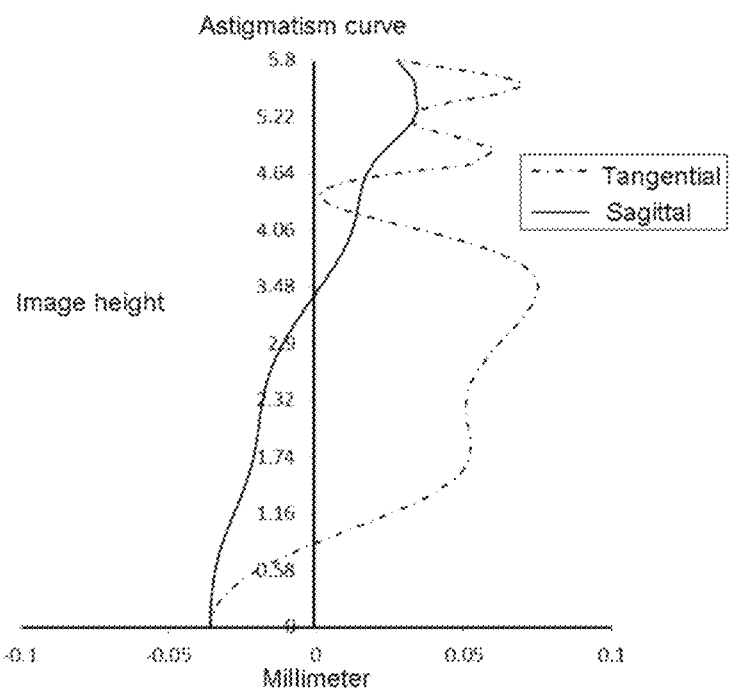
Figure 4C:
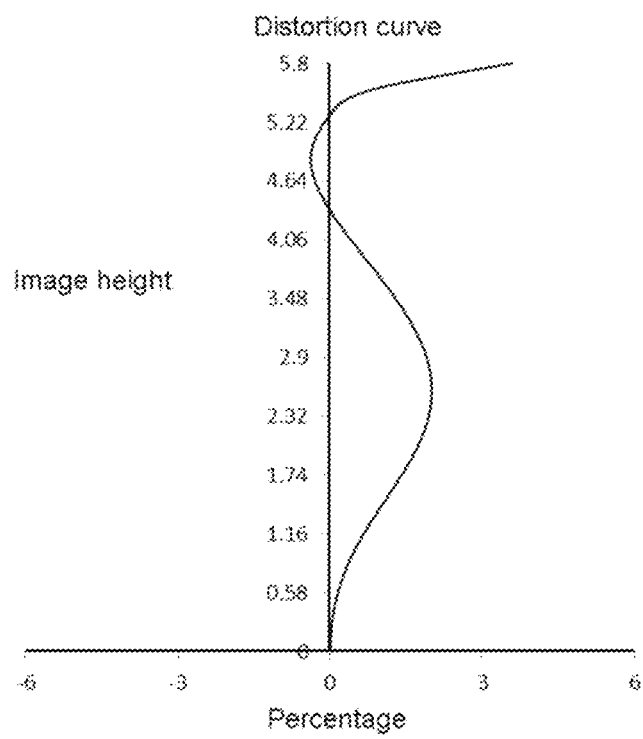

FIG. 4A illustrates a longitudinal aberration curve of the optical imaging lens assembly in Embodiment 2, which represents that a convergence focus of light rays of different wavelengths is deviated after the light rays pass through the lens. FIG. 4B illustrates an astigmatism curve of the optical imaging lens assembly of Embodiment 2, which represents a curvature of tangential image surface and a curvature of sagittal image surface. FIG. 4O illustrates a distortion curve of the optical imaging lens assembly of Embodiment 2, which represents distortion magnitude values corresponding to different image heights. FIG. 4A to FIG. 4O illustrate that the optical imaging lens assembly provided in Embodiment 2 is capable of achieving good imaging quality.

Embodiment 3

Figure 5:
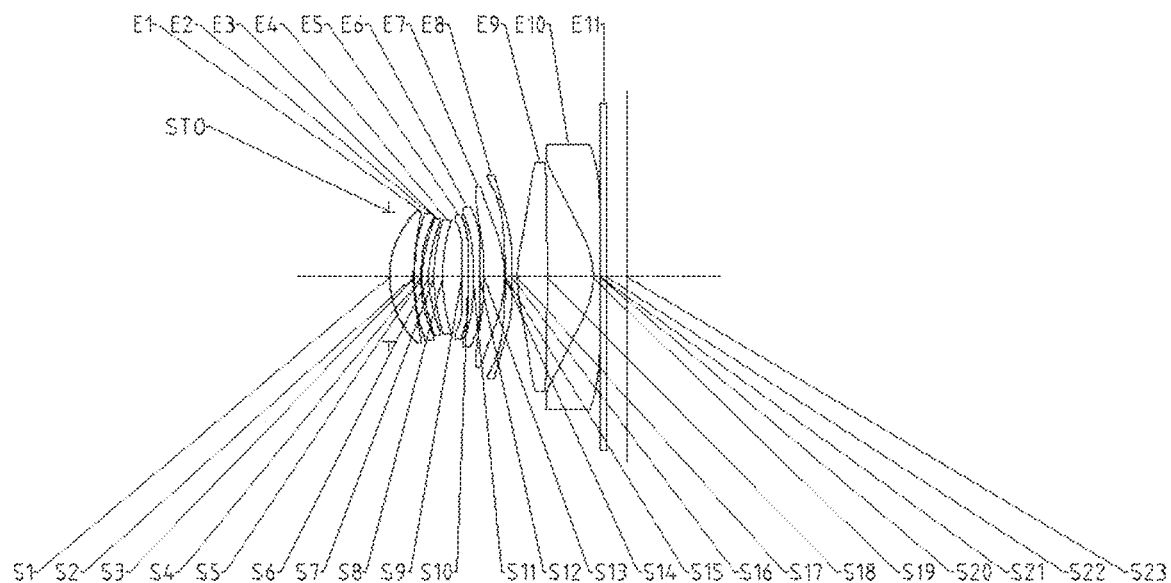
FIG. 5 illustrates a structural schematic diagram of an optical imaging lens assembly according to Embodiment 3 of the disclosure.

An optical imaging lens assembly according to Embodiment 3 of the disclosure is described below with reference to FIG. 5 to FIG. 6O. FIG. 5 shows a structural schematic diagram of an optical imaging lens assembly according to Embodiment 3 of the disclosure.

As shown in FIG. 5, the optical imaging lens assembly sequentially includes from an object side to an image side: a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging surface S23.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a negative refractive power, an object-side surface S11 thereof is a convex surface, and an image-side surface S12 thereof is a concave surface. The seventh lens E7 has a positive refractive power, an object-side surface S13 thereof is a concave surface, and an image-side surface S14 thereof is a convex surface. The eighth lens E8 has a negative refractive power, an object-side surface S15 thereof is a concave surface, and an image-side surface S16 thereof is a concave surface. The ninth lens E9 has a positive refractive power, an object-side surface S17 thereof is a convex surface, and an image-side surface S18 thereof is a convex surface. The tenth lens E10 has a negative refractive power, an object-side surface S19 thereof is a concave surface, and an image-side surface S20 thereof is a convex surface. The optical filter E11 has an object-side surface S21 and an image-side surface S22. Light from an object sequentially passes through each of the surfaces from S1 to S22 and is finally imaged on the imaging surface S23.

In this embodiment, f is a total effective focal length of the optical imaging lens assembly, f equals 5.48 mm, TTL is a total length of the optical imaging lens assembly, TTL equals 7.63 mm, and ImgH is a half of a diagonal length of an effective pixel region on the imaging surface S23, ImgH equals 4.77 mm.

Table 5 illustrates a table of basic parameters of the optical imaging lens assembly of Embodiment 3, wherein the units of the curvature radius, thickness/distance, and focal length are all millimeters (mm). Table 6 illustrates high order term coefficients applicable to various aspheric mirror surfaces in Embodiment 3, wherein shapes of various aspheric surfaces may be defined by the formula (1) provided in above-mentioned Embodiment 1.

TABLE 5

| Surface number | Surface type | Curvature radius | Thickness/ distance | Material Refractive index | Abbe number | Focal length | Conic coefficient |
|---|---|---|---|---|---|---|---|
| OBJ | Spherical | Infinity | Infinity | | | | |
| STO | Spherical | Infinity | 0.0200 | | | | |
| S1 | Aspheric | 2.9766 | 0.7727 | 1.55 | 52.1 | 10.93 | 0.0000 |
| S2 | Aspheric | 5.3468 | 0.0354 | | | | 0.0000 |
| S3 | Aspheric | 18.7636 | 0.2100 | 1.66 | 19.9 | −74.50 | 0.0000 |
| S4 | Aspheric | 13.5410 | 0.0245 | | | | 0.0000 |
| S5 | Aspheric | 2.8141 | 0.2118 | 1.67 | 19.2 | 39.60 | 0.0000 |
| S6 | Aspheric | 3.0509 | 0.1725 | | | | 0.0000 |
| S7 | Aspheric | 5.9335 | 0.2809 | 1.57 | 39.3 | −418.31 | 0.0000 |
| S8 | Aspheric | 5.6900 | 0.6142 | | | | 0.0000 |
| S9 | Aspheric | 30.9002 | 0.2102 | 1.67 | 19.1 | 38.02 | 0.0000 |
| S10 | Aspheric | −151.4526 | 0.1470 | | | | 0.0000 |
| S11 | Aspheric | 3994.3233 | 0.2135 | 1.59 | 27.6 | −13.60 | 0.0000 |
| S12 | Aspheric | 8.1240 | 0.1450 | | | | 0.0000 |
| S13 | Aspheric | −10.1500 | 0.6639 | 1.62 | 24.2 | 8.65 | 0.0000 |
| S14 | Aspheric | −3.6276 | 0.0200 | | | | 0.0000 |
| S15 | Aspheric | −11.2638 | 0.2100 | 1.57 | 34.1 | −19.52 | 0.0000 |
| S16 | Aspheric | 33112.4637 | 0.1775 | | | | 0.0000 |
| S17 | Aspheric | 3.9618 | 0.9796 | 1.59 | 31.6 | 5.31 | −1.0000 |
| S18 | Aspheric | −13.8207 | 1.4612 | | | | 0.0000 |
| S19 | Aspheric | −2.3325 | 0.2100 | 1.64 | 21.9 | −3.75 | −1.0000 |
| S20 | Aspheric | −77.4659 | 0.0227 | | | | 0.0000 |
| S21 | Spherical | Infinity | 0.2100 | 1.52 | 64.2 | | |
| S22 | Spherical | Infinity | 0.6400 | | | | |
| S23 | Spherical | Infinity | | | | | |

TABLE 6

| Surface number | A4 | A6 | A8 | A10 | A12 | A14 | A16 |
|---|---|---|---|---|---|---|---|
| S1 | −1.5316E−02 | 2.7677E−02 | −2.1432E−02 | 8.4244E−03 | −1.7573E−03 | 1.8576E−04 | −7.8386E−06 |
| S2 | −3.4852E−02 | 2.6725E−02 | −1.5926E−02 | 5.9056E−03 | −1.2881E−03 | 1.5145E−04 | −7.4155E−06 |
| S3 | 3.4619E−02 | −1.6007E−03 | −5.7354E−03 | 2.3186E−03 | −3.5323E−04 | 1.6895E−05 | 3.8239E−07 |
| S4 | 6.6237E−02 | −2.8252E−02 | 1.2479E−02 | −5.7512E−03 | 1.7261E−03 | −2.7473E−04 | 1.7735E−05 |
| S5 | −4.6260E−02 | 1.4944E−02 | −7.2605E−03 | 2.2894E−03 | −2.7981E−04 | −1.1890E−05 | 3.6027E−06 |
| S6 | −2.6007E−02 | −6.0701E−03 | 5.9039E−03 | −2.1596E−03 | 4.6584E−04 | −2.8735E−05 | −2.0667E−06 |
| S7 | 2.1586E−02 | −2.2825E−02 | 1.6136E−02 | −8.3159E−03 | 2.5573E−03 | −4.1269E−04 | 2.7445E−05 |
| S8 | −1.6457E−02 | 2.3767E−02 | −1.7562E−02 | 7.2266E−03 | −1.7188E−03 | 2.1471E−04 | −1.0009E−05 |
| S9 | −1.8235E−03 | −1.3089E−02 | 2.9104E−03 | −2.1564E−03 | 1.1931E−03 | −2.5980E−04 | 2.0930E−05 |
| S10 | 6.8499E−03 | −1.6626E−02 | 5.8253E−03 | −2.2744E−03 | 7.4361E−04 | −1.1908E−04 | 7.4482E−06 |
| S11 | −3.6166E−02 | −3.2243E−03 | 1.0363E−02 | −4.3746E−03 | 7.0959E−04 | −3.0160E−05 | −1.6242E−06 |
| S12 | −4.9885E−02 | 6.0355E−03 | 2.6601E−03 | −1.2632E−03 | 1.2906E−04 | 9.0364E−06 | −1.4142E−06 |
| S13 | −9.6431E−03 | 3.4092E−03 | −1.1407E−04 | −8.6401E−05 | 1.5975E−05 | −1.1370E−06 | 2.9463E−08 |
| S14 | 2.2542E−03 | 3.6260E−03 | −1.1052E−03 | 2.1598E−04 | −2.3575E−05 | 1.2571E−06 | −2.4861E−08 |
| S15 | 1.8254E−02 | −1.0758E−02 | 3.4806E−03 | −6.6580E−04 | 7.1137E−05 | −3.9499E−06 | 8.9677E−08 |
| S16 | −1.7122E−02 | −3.7265E−03 | 2.4703E−03 | −4.7299E−04 | 4.4689E−05 | −2.1245E−06 | 4.0526E−08 |
| S17 | −2.1714E−02 | 2.8768E−03 | −2.7781E−04 | 2.0127E−05 | −9.8446E−07 | 2.8172E−08 | −3.5108E−10 |
| S18 | 1.3607E−02 | −2.5939E−03 | 2.9689E−04 | −2.2069E−05 | 9.9981E−07 | −2.4458E−08 | 2.4596E−10 |
| S19 | 1.7183E−02 | −1.7349E−03 | 1.8552E−04 | −1.6245E−05 | 9.4472E−07 | −3.0597E−08 | 4.0411E−10 |
| S20 | 3.6963E−03 | −7.3364E−04 | 5.6450E−05 | −2.4772E−06 | 5.8548E−08 | −6.0868E−10 | 1.2649E−12 |

Figure 6A:
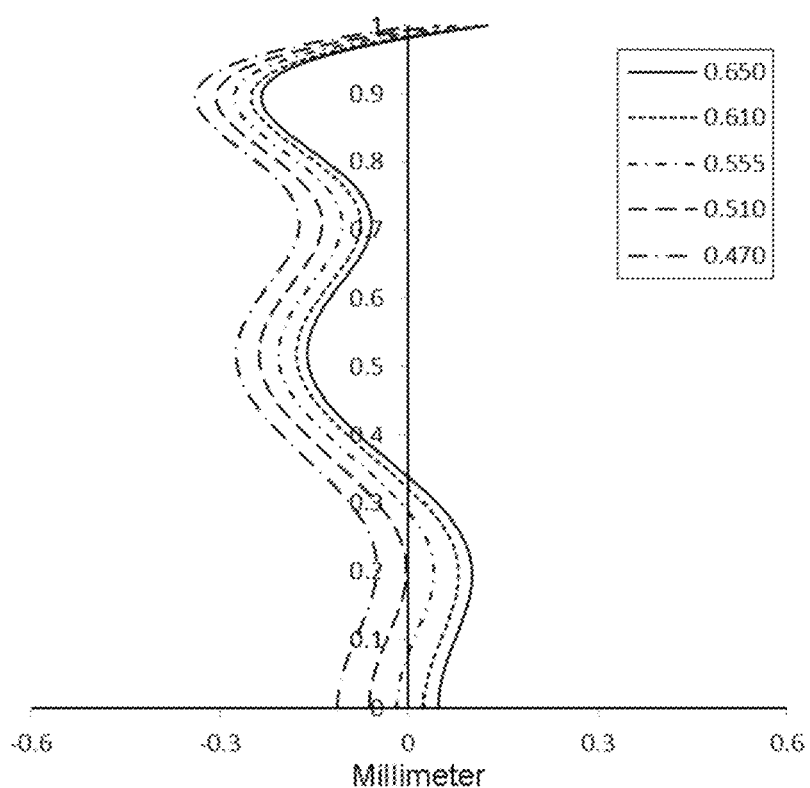
FIGS. 6A-6C illustrate a longitudinal aberration curve, an astigmatism curve and a distortion curve of the optical imaging lens assembly in Embodiment 3 respectively.
Figure 6B:
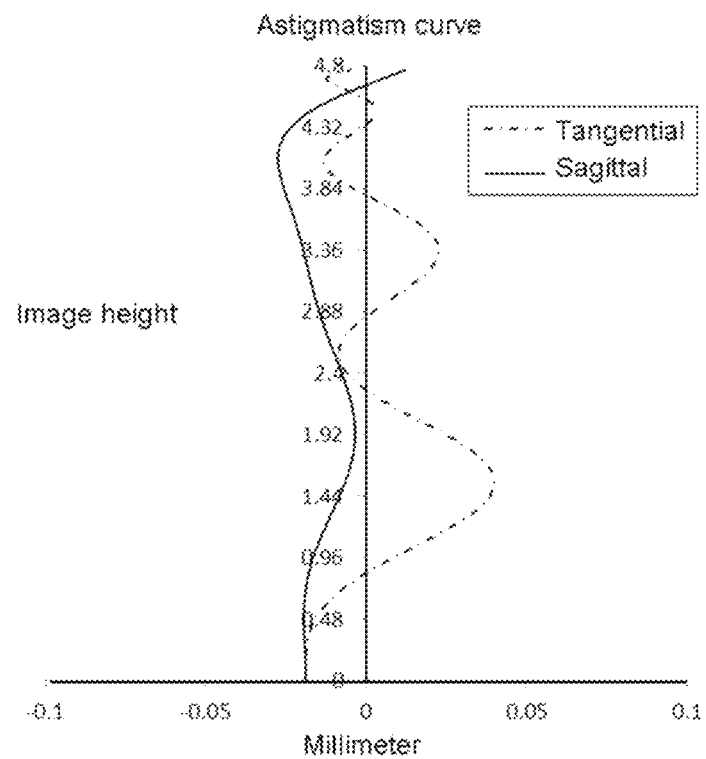
Figure 6C:
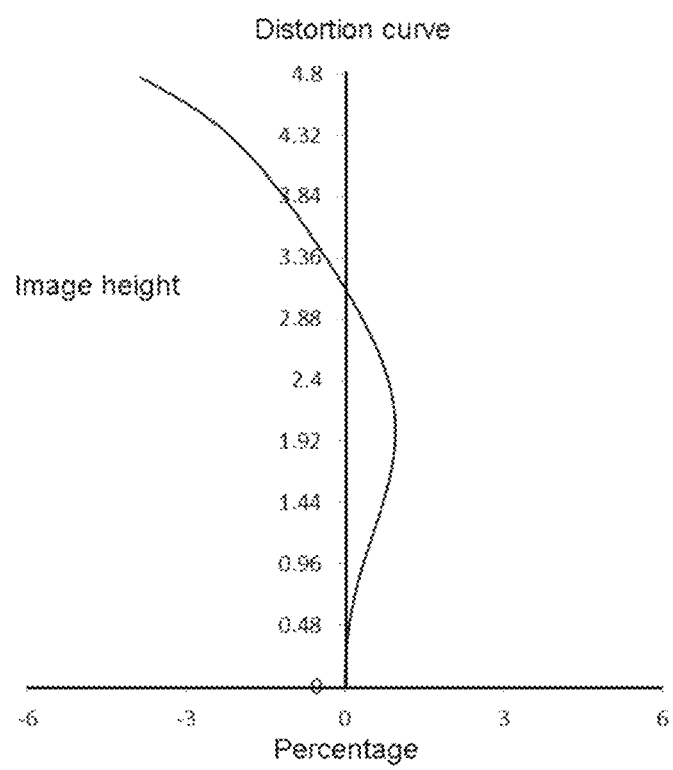

FIG. 6A illustrates a longitudinal aberration curve of the optical imaging lens assembly in Embodiment 3, which represents that a convergence focus of light rays of different wavelengths is deviated after the light rays pass through the lens. FIG. 6B illustrates an astigmatism curve of the optical imaging lens assembly of Embodiment 3, which represents a curvature of tangential image surface and a curvature of sagittal image surface. FIG. 6C illustrates a distortion curve of the optical imaging lens assembly of Embodiment 3, which represents distortion magnitude values corresponding to different image heights. FIG. 6A to FIG. 6C illustrate that the optical imaging lens assembly provided in Embodiment 3 is capable of achieving good imaging quality.

Embodiment 4

Figure 7:
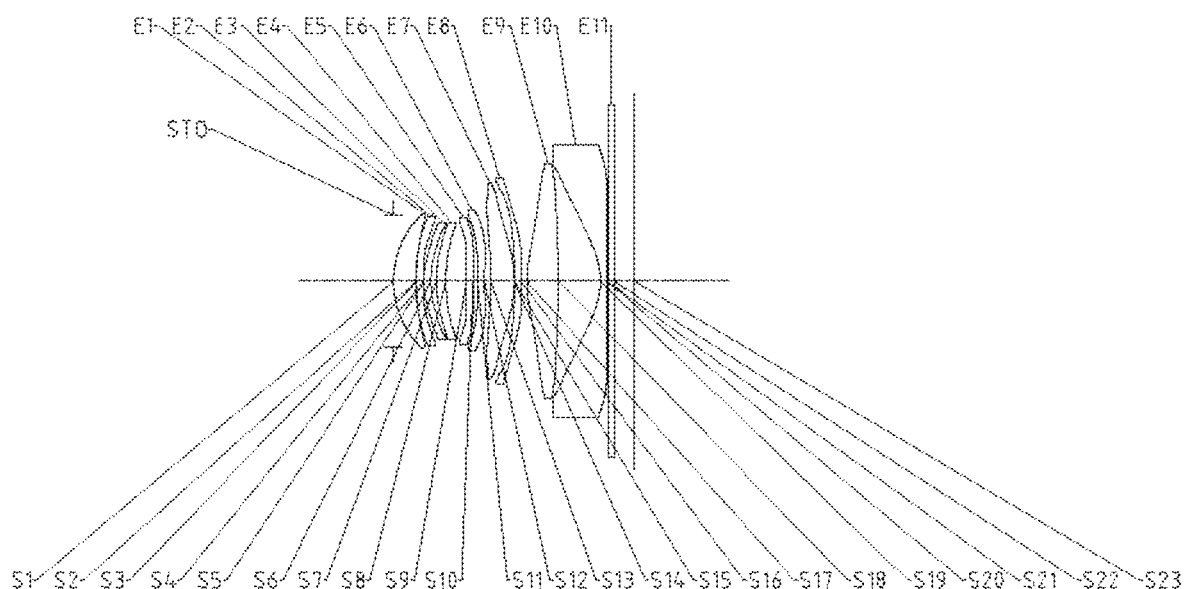
FIG. 7 illustrates a structural schematic diagram of an optical imaging lens assembly according to Embodiment 4 of the disclosure.

An optical imaging lens assembly according to Embodiment 4 of the disclosure is described below with reference to FIG. 7 to FIG. 8C. FIG. 7 shows a structural schematic diagram of an optical imaging lens assembly according to Embodiment 4 of the disclosure.

As shown in FIG. 7, the optical imaging lens assembly sequentially includes from an object side to an image side: a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging surface S23.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a concave surface. The fifth lens E5 has a negative refractive power, an object-side surface S9 thereof is a convex surface, and an image-side surface S10 thereof is a concave surface. The sixth lens E6 has a negative refractive power, an object-side surface S11 thereof is a convex surface, and an image-side surface S12 thereof is a concave surface. The seventh lens E7 has a positive refractive power, an object-side surface S13 thereof is a concave surface, and an image-side surface S14 thereof is a convex surface. The eighth lens E8 has a negative refractive power, an object-side surface S15 thereof is a concave surface, and an image-side surface S16 thereof is a convex surface. The ninth lens E9 has a positive refractive power, an object-side surface S17 thereof is a convex surface, and an image-side surface S18 thereof is a convex surface. The tenth lens E10 has a negative refractive power, an object-side surface S19 thereof is a concave surface, and an image-side surface S20 thereof is a convex surface. The optical filter E11 has an object-side surface S21 and an image-side surface S22. Light from an object sequentially passes through each of the surfaces from S1 to S22 and is finally imaged on the imaging surface S23.

In this embodiment, f is a total effective focal length of the optical imaging lens assembly, f equals 5.28 mm, TTL is a total length of the optical imaging lens assembly, TTL equals 7.64 mm, and ImgH is a half of a diagonal length of an effective pixel region on the imaging surface S23, ImgH equals 4.90 mm.

Table 7 illustrates a table of basic parameters of the optical imaging lens assembly of Embodiment 4, wherein the units of the curvature radius, thickness/distance, and focal length are all millimeters (mm). Table 8 illustrates high order term coefficients applicable to various aspheric mirror surfaces in Embodiment 4, wherein shapes of various aspheric surfaces may be defined by the formula (1) provided in above-mentioned Embodiment 1.

TABLE 7

| Surface number | Surface type | Curvature radius | Thickness/ distance | Material Refractive index | Abbe number | Focal length | Conic coefficient |
|---|---|---|---|---|---|---|---|
| OBJ | Spherical | Infinity | Infinity | | | | |
| STO | Spherical | Infinity | 0.0200 | | | | |
| S1 | Aspheric | 2.9362 | 0.6997 | 1.55 | 52.7 | 12.81 | 0.0000 |
| S2 | Aspheric | 4.6100 | 0.0327 | | | | 0.0000 |
| S3 | Aspheric | 16.1327 | 0.2100 | 1.66 | 19.5 | −8315.32 | 0.0000 |
| S4 | Aspheric | 16.0021 | 0.0262 | | | | 0.0000 |
| S5 | Aspheric | 2.6302 | 0.2111 | 1.67 | 19.0 | 131.30 | 0.0000 |
| S6 | Aspheric | 2.6228 | 0.1817 | | | | 0.0000 |
| S7 | Aspheric | 4.4206 | 0.3000 | 1.60 | 29.0 | 32.30 | 0.0000 |
| S8 | Aspheric | 5.5751 | 0.6543 | | | | 0.0000 |
| S9 | Aspheric | 54.1180 | 0.2100 | 1.65 | 20.9 | −494.63 | 0.0000 |
| S10 | Aspheric | 46.2652 | 0.1380 | | | | 0.0000 |
| S11 | Aspheric | 45.5981 | 0.2172 | 1.55 | 47.0 | −17.58 | 0.0000 |
| S12 | Aspheric | 8.0481 | 0.2056 | | | | 0.0000 |
| S13 | Aspheric | −18.9145 | 0.7395 | 1.61 | 27.3 | 8.37 | 0.0000 |
| S14 | Aspheric | −4.0803 | 0.0200 | | | | 0.0000 |
| S15 | Aspheric | −10.3242 | 0.2100 | 1.58 | 32.3 | −18.67 | 0.0000 |
| S16 | Aspheric | −223.5561 | 0.1824 | | | | 0.0000 |
| S17 | Aspheric | 3.9591 | 1.0026 | 1.59 | 30.6 | 5.03 | −1.0000 |
| S18 | Aspheric | −10.9718 | 1.3226 | | | | 0.0000 |
| S19 | Aspheric | −2.2326 | 0.2100 | 1.59 | 27.7 | −3.98 | −1.0000 |
| S20 | Aspheric | −37.2062 | 0.0200 | | | | 0.0000 |
| S21 | Spherical | Infinity | 0.2100 | 1.52 | 64.2 | | |
| S22 | Spherical | Infinity | 0.6400 | | | | |
| S23 | Spherical | Infinity | | | | | |

TABLE 8

| Surface number | A4 | A6 | A8 | A10 | A12 | A14 | A16 |
|---|---|---|---|---|---|---|---|
| S1 | −3.8485E−03 | 3.4317E−03 | −1.7585E−03 | 5.1168E−04 | −8.1722E−05 | 6.6737E−06 | −2.1803E−07 |
| S2 | −3.2140E−02 | 2.3557E−02 | −1.4296E−02 | 5.3982E−03 | −1.1932E−03 | 1.4186E−04 | −7.0255E−06 |
| S3 | 3.3751E−02 | −1.5603E−03 | −5.1773E−03 | 2.0124E−03 | −2.8387E−04 | 9.6222E−06 | 6.7063E−07 |
| S4 | 6.1250E−02 | −2.2548E−02 | 8.2033E−03 | −3.9768E−03 | 1.3173E−03 | −2.2565E−04 | 1.5352E−05 |
| S5 | −3.7235E−02 | 1.9655E−03 | 3.3136E−03 | −2.7609E−03 | 1.0806E−03 | −2.0473E−04 | 1.4759E−05 |
| S6 | −3.8586E−02 | 8.7338E−03 | −6.8334E−03 | 3.9915E−03 | −1.2386E−03 | 2.2493E−04 | −1.7790E−05 |
| S7 | 4.5868E−03 | −3.0129E−03 | 1.5453E−03 | −2.2178E−03 | 1.1057E−03 | −2.2952E−04 | 1.8194E−05 |
| S8 | 3.2935E−03 | 7.8327E−04 | −7.6885E−04 | −1.3252E−04 | 1.7731E−04 | −4.7149E−05 | 4.6288E−06 |
| S9 | 3.3692E−03 | −1.7310E−02 | 5.1181E−03 | −3.0360E−03 | 1.4455E−03 | −3.0205E−04 | 2.3997E−05 |
| S10 | 2.0111E−03 | −1.3344E−02 | 4.3031E−03 | −1.7816E−03 | 6.3841E−04 | −1.0626E−04 | 6.7715E−06 |
| S11 | −3.5960E−02 | −4.0702E−03 | 1.1133E−02 | −4.7195E−03 | 7.8293E−04 | −3.6391E−05 | −1.5341E−06 |

TABLE 8-continued

| Surface number | A4 | A6 | A8 | A10 | A12 | A14 | A16 |
|---|---|---|---|---|---|---|---|
| S12 | −5.0984E−02 | 6.6803E−03 | 2.4816E−03 | −1.2302E−03 | 1.2729E−04 | 8.5993E−06 | −1.3649E−06 |
| S13 | −9.3836E−03 | 3.3446E−03 | −1.4513E−04 | −7.6252E−05 | 1.4720E−05 | −1.0655E−06 | 2.7918E−08 |
| S14 | 1.7904E−03 | 4.0873E−03 | −1.3517E−03 | 2.8013E−04 | −3.2822E−05 | 1.9112E−06 | −4.2957E−08 |
| S15 | 1.7663E−02 | −9.9750E−03 | 3.1354E−03 | −5.8516E−04 | 6.1000E−05 | −3.3039E−06 | 7.3168E−08 |
| S16 | −1.6719E−02 | −3.6480E−03 | 2.3629E−03 | −4.4504E−04 | 4.1407E−05 | −1.9392E−06 | 3.6446E−08 |
| S17 | −2.2087E−02 | 2.9353E−03 | −2.8440E−04 | 2.0453E−05 | −9.9144E−07 | 2.8226E−08 | −3.5156E−10 |
| S18 | 1.4316E−02 | −2.7419E−03 | 3.1575E−04 | −2.3547E−05 | 1.0717E−06 | −2.6386E−08 | 2.6739E−10 |
| S19 | 1.9056E−02 | −1.7219E−03 | 1.9740E−04 | −2.1590E−05 | 1.4501E−06 | −5.0326E−08 | 6.9140E−10 |
| S20 | 7.0930E−03 | −1.1427E−03 | 8.5234E−05 | −3.8641E−06 | 1.0366E−07 | −1.4816E−09 | 8.5984E−12 |

Figure 8A:
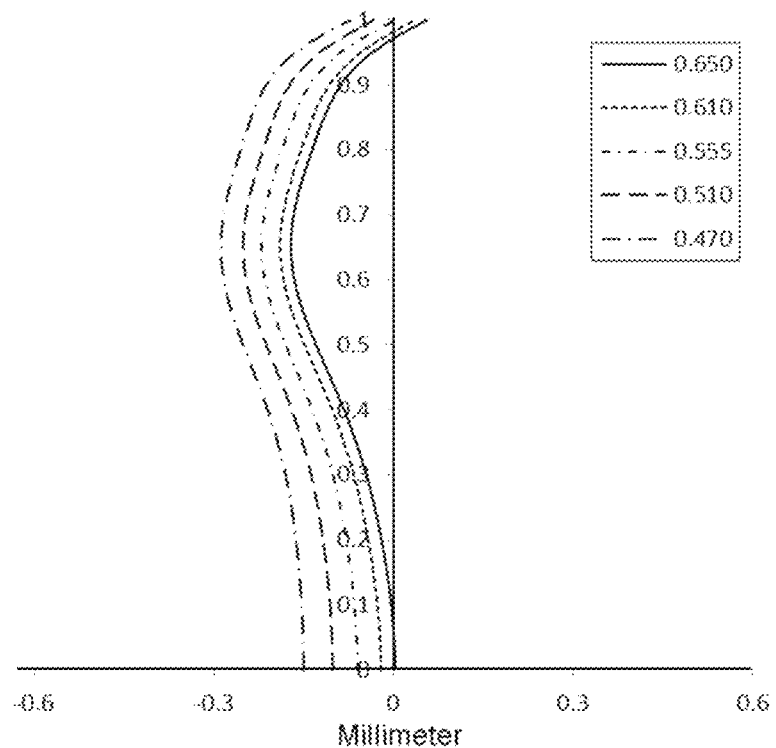
FIGS. 8A-8C illustrate a longitudinal aberration curve, an astigmatism curve and a distortion curve of the optical imaging lens assembly in Embodiment 4 respectively.
Figure 8B:
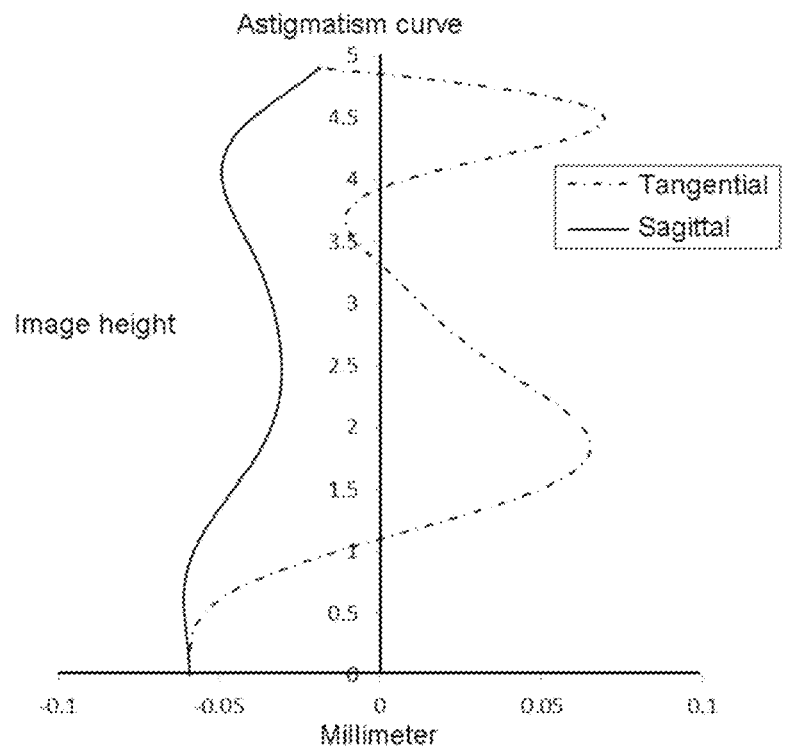
Figure 8C:
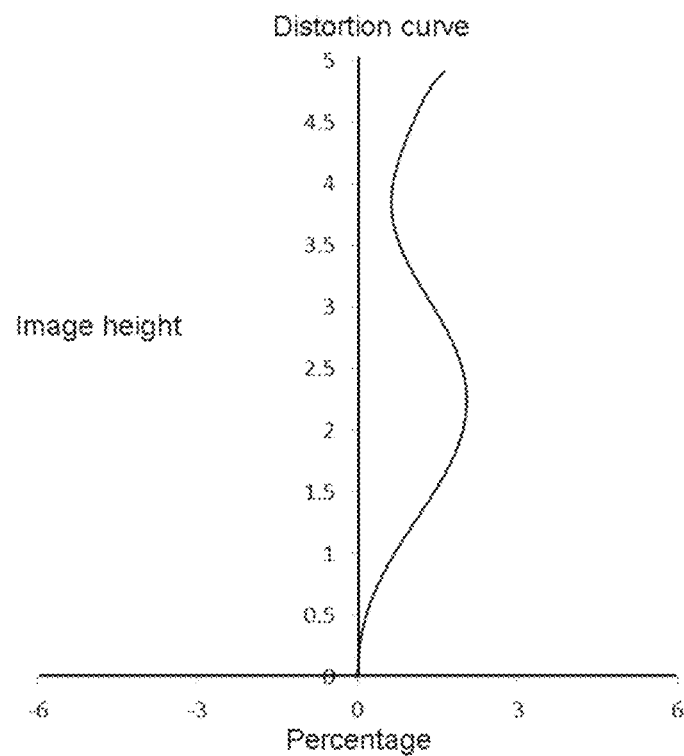

FIG. 8A illustrates a longitudinal aberration curve of the optical imaging lens assembly in Embodiment 4, which represents that a convergence focus of light rays of different wavelengths is deviated after the light rays pass through the lens. FIG. 8B illustrates an astigmatism curve of the optical imaging lens assembly of Embodiment 4, which represents a curvature of tangential image surface and a curvature of sagittal image surface. FIG. 8C illustrates a distortion curve of the optical imaging lens assembly of Embodiment 4, which represents distortion magnitude values corresponding to different image heights. FIG. 8A to FIG. 8C illustrate that the optical imaging lens assembly provided in Embodiment 4 is capable of achieving good imaging quality.

Embodiment 5

Figure 9:
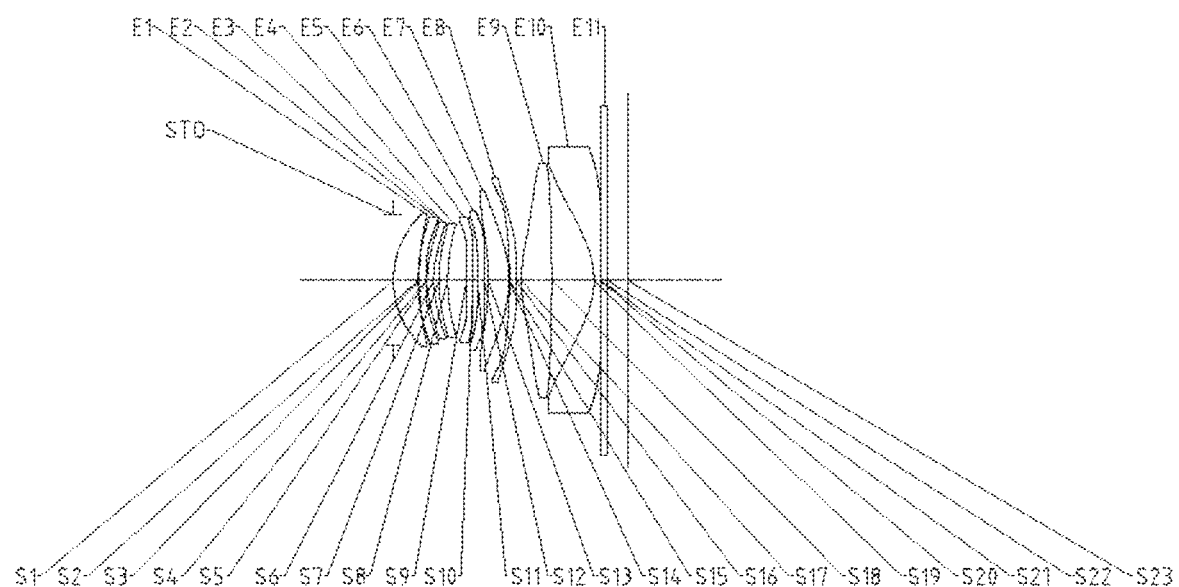
FIG. 9 illustrates a structural schematic diagram of an optical imaging lens assembly according to Embodiment 5 of the disclosure.

An optical imaging lens assembly according to Embodiment 5 of the disclosure is described below with reference to FIG. 9 to FIG. 10C. FIG. 9 shows a structural schematic diagram of an optical imaging lens assembly according to Embodiment 5 of the disclosure.

As shown in FIG. 9, the optical imaging lens assembly sequentially includes from an object side to an image side: a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging surface S23.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a negative refractive power, an object-side surface S7 thereof is a convex surface, and an image-side surface S8 thereof is a concave surface. The fifth lens E5 has a negative refractive power, an object-side surface S9 thereof is a convex surface, and an image-side surface S10 thereof is a concave surface. The sixth lens E6 has a negative refractive power, an object-side surface S11 thereof is a convex surface, and an image-side surface S12 thereof is a concave surface. The seventh lens E7 has a positive refractive power, an object-side surface S13 thereof is a concave surface, and an image-side surface S14 thereof is a convex surface. The eighth lens E8 has a negative refractive power, an object-side surface S15 thereof is a concave surface, and an image-side surface S16 thereof is a concave surface. The ninth lens E9 has a positive refractive power, an object-side surface S17 thereof is a convex surface, and an image-side surface S18 thereof is a convex surface. The tenth lens E10 has a negative refractive power, an object-side surface S19 thereof is a concave surface, and an image-side surface S20 thereof is a concave surface. The optical filter E11 has an object-side surface S21 and an image-side surface S22. Light from an object sequentially passes through each of the surfaces from S1 to S22 and is finally imaged on the imaging surface S23.

In this embodiment, f is a total effective focal length of the optical imaging lens assembly, f equals 5.41 mm, TTL is a total length of the optical imaging lens assembly, TIL equals 7.51 mm, and ImgH is a half of a diagonal length of an effective pixel region on the imaging surface 323, ImgH equals 4.61 mm.

Table 9 illustrates a table of basic parameters of the optical imaging lens assembly of Embodiment 5, wherein the units of the curvature radius, thickness/distance, and focal length are all millimeters (mm). Table 10 illustrates high order term coefficients applicable to various aspheric mirror surfaces in Embodiment 5, wherein shapes of various aspheric surfaces may be defined by the formula (1) provided in above-mentioned Embodiment 1.

TABLE 9

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinity | Infinity | | | | |
| STO | Spherical | Infinity | 0.0200 | | | | |
| S1 | Aspheric | 2.9093 | 0.7912 | 1.55 | 51.3 | 11.59 | 0.0000 |
| S2 | Aspheric | 4.8237 | 0.0372 | | | | 0.0000 |
| S3 | Aspheric | 19.6419 | 0.2138 | 1.66 | 19.8 | −169.50 | 0.0000 |
| S4 | Aspheric | 16.6562 | 0.0327 | | | | 0.0000 |
| S5 | Aspheric | 2.7581 | 0.2100 | 1.67 | 19.2 | 31.93 | 0.0000 |
| S6 | Aspheric | 3.0666 | 0.1742 | | | | 0.0000 |
| S7 | Aspheric | 5.9159 | 0.2766 | 1.55 | 52.7 | −415.66 | 0.0000 |
| S8 | Aspheric | 5.6710 | 0.6040 | | | | 0.0000 |

TABLE 9-continued

| Surface number | Surface type | Curvature radius | Thickness/ distance | Material Refractive index | Abbe number | Focal length | Conic coefficient |
|---|---|---|---|---|---|---|---|
| S9 | Aspheric | 29.5721 | 0.2102 | 1.66 | 19.8 | −372.16 | 0.0000 |
| S10 | Aspheric | 26.3412 | 0.1388 | | | | 0.0000 |
| S11 | Aspheric | 18.9153 | 0:2195 | 1.62 | 24.9 | −25.37 | 0.0000 |
| S12 | Aspheric | 8.5769 | 0.1294 | | | | 0.0000 |
| S13 | Aspheric | −10.5865 | 0.6654 | 1.62 | 25.5 | 8.82 | 0.0000 |
| S14 | Aspheric | −3.6912 | 0.0200 | | | | 0.0000 |
| S15 | Aspheric | −10.9378 | 0.2100 | 1.58 | 33.7 | −18.21 | 0.0000 |
| S16 | Aspheric | 408.8716 | 0.1624 | | | | 0.0000 |
| S17 | Aspheric | 4.0323 | 0.9810 | 1.60 | 28.8 | 5.27 | −1.0000 |
| S18 | Aspheric | −13.5723 | 1.3531 | | | | 0.0000 |
| S19 | Aspheric | −2.5752 | 0.2100 | 1.67 | 19.0 | −3.75 | −1.0000 |
| S20 | Aspheric | 177.6320 | 0.0200 | | | | 0.0000 |
| S21 | Spherical | Infinity | 0.2100 | 1.52 | 64.2 | | |
| S22 | Spherical | Infinity | 0:6400 | | | | |
| S23 | Spherical | Infinity | | | | | |

TABLE 10

| Surface number | A4 | A6 | A8 | A10 | A12 | A14 | A16 |
|---|---|---|---|---|---|---|---|
| S1 | −2.0713E−02 | 3.6966E−02 | −2.8180E−02 | 1.0846E−02 | −2.2127E−03 | 2.2870E−04 | −9.4373E−06 |
| S2 | −3.8333E−02 | 3.0354E−02 | −1.8887E−02 | 7.3933E−03 | −1.7107E−03 | 2.1342E−04 | −1.1062E−05 |
| S3 | 3.7687E−02 | −2.8272E−03 | −5.6172E−03 | 2.2634E−03 | −3.0189E−04 | 3.8339E−06 | 1.4179E−06 |
| S4 | 6.5943E−02 | −2.6704E−02 | 1.0937E−02 | −4.9868E−03 | 1.5167E−03 | −2.4466E−04 | 1.5972E−05 |
| So | −4.4321E−02 | 1.0316E−02 | −3.4351E−03 | 5.6688E−04 | 1.5817E−04 | −7.1338E−05 | 6.9521E−06 |
| S6 | −2.0092E−02 | −1.3056E−02 | 1.1812E−02 | −5.1578E−03 | 1.3433E−03 | −1.6593E−04 | 6.8199E−06 |
| S7 | 1.9724E−02 | −1.7292E−02 | 1.0774E−02 | −5.7690E−03 | 1.9111E−03 | −3.2845E−04 | 2.3083E−05 |
| S8 | −1.0994E−02 | 2.1403E−02 | −1.8686E−02 | 8.6446E−03 | −2.2674E−03 | 3.1104E−04 | −1.6263E−05 |
| S9 | 2.4938E−03 | −1.8378E−02 | 6.4146E−03 | −3.3695E−03 | 1.4166E−03 | −2.8045E−04 | 2.1648E−05 |
| S10 | 1.1533E−03 | −1.2136E−02 | 3.5611E−03 | −1.5919E−03 | 6.2265E−04 | −1.0702E−04 | 6.8958E−06 |
| S11 | −4.1177E−02 | −8.6030E−04 | 9.5582E−03 | −4.2236E−03 | 6.8949E−04 | −2.6582E−05 | −1.9852E−06 |
| S12 | −4.6563E−02 | 3.8273E−03 | 3.8592E−03 | −1.6396E−03 | 1.9912E−04 | 1.7376E−06 | −1.0902E−06 |
| S13 | −9.8103E−03 | 3.4309E−03 | −1.1360E−04 | −8.8822E−05 | 1.6420E−05 | −1.1681E−06 | 3.0245E−08 |
| S14 | 2.1079E−03 | 3.1751E−03 | −9.4895E−04 | 1.8442E−04 | −1.9927E−05 | 1.0480E−06 | −2.0474E−08 |
| S15 | 1.7663E−03 | −9.8774E−03 | 3.1343E−03 | −5.9410E−04 | 6.2879E−05 | −3.4538E−06 | 7.7509E−08 |
| S16 | −1.7482E−02 | −4.2249E−03 | 2.6888E−03 | −5.1456E−04 | 4.8882E−05 | −2.3417E−06 | 4.5059E−08 |
| S17 | −2.1638E−02 | 2.9840E−03 | −3.0308E−04 | 2.2634E−05 | −1.1150E−06 | 3.1663E−08 | −3.8895E−10 |
| S18 | 1.3514E−02 | −2.7478E−03 | 3.3043E−04 | −2.5231E−05 | 1.1582E−06 | −2.8558E−08 | 2.8912E−10 |
| S19 | 9.1281E−03 | 1.2552E−04 | −7.5318E−05 | 5.6730E−06 | −8.2520E−08 | −6.8470E−09 | 2.0515E−10 |
| S20 | 2.0684E−03 | −7.9449E−04 | 8.0796E−05 | −4.3300E−06 | 1.2193E−07 | −1.6430E−09 | 7.7719E−12 |

Figure 10A:
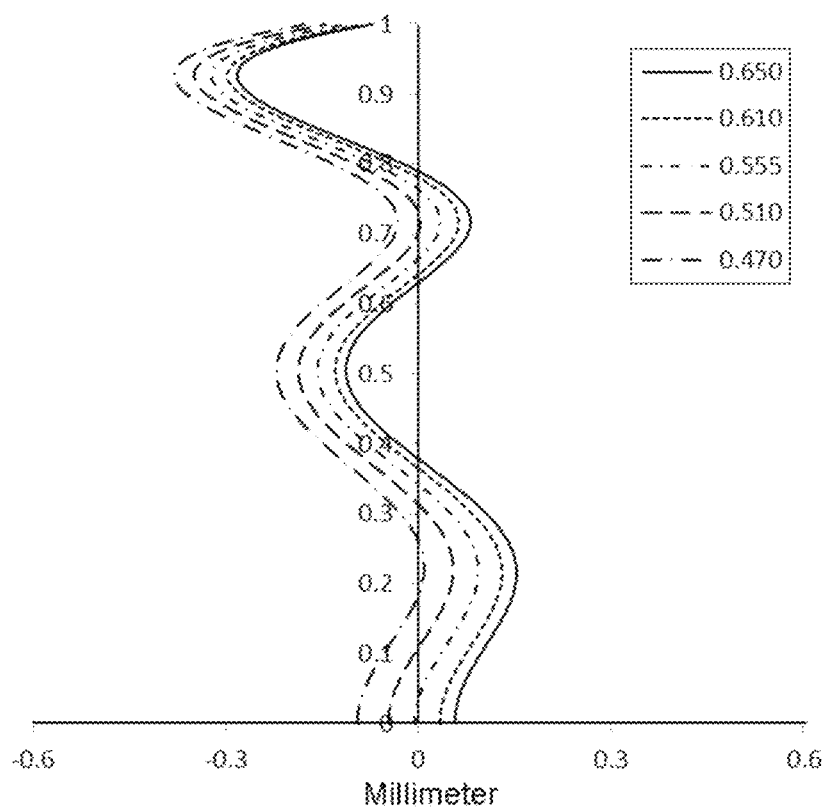
FIGS. 10A-10C illustrate a longitudinal aberration curve, an astigmatism curve and a distortion curve of the optical imaging lens assembly in Embodiment 5 respectively.
Figure 10B:
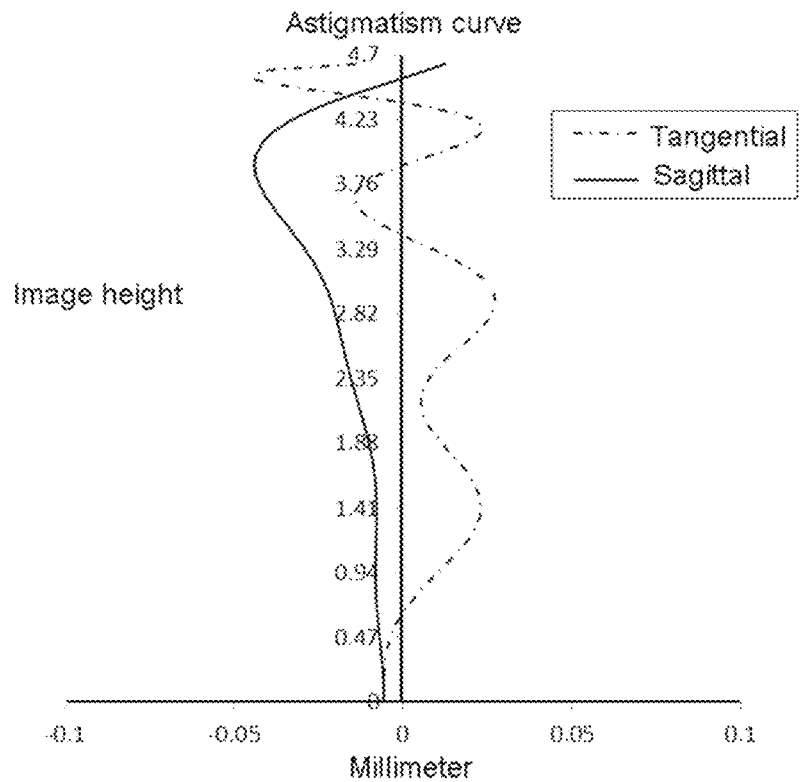
Figure 10C:
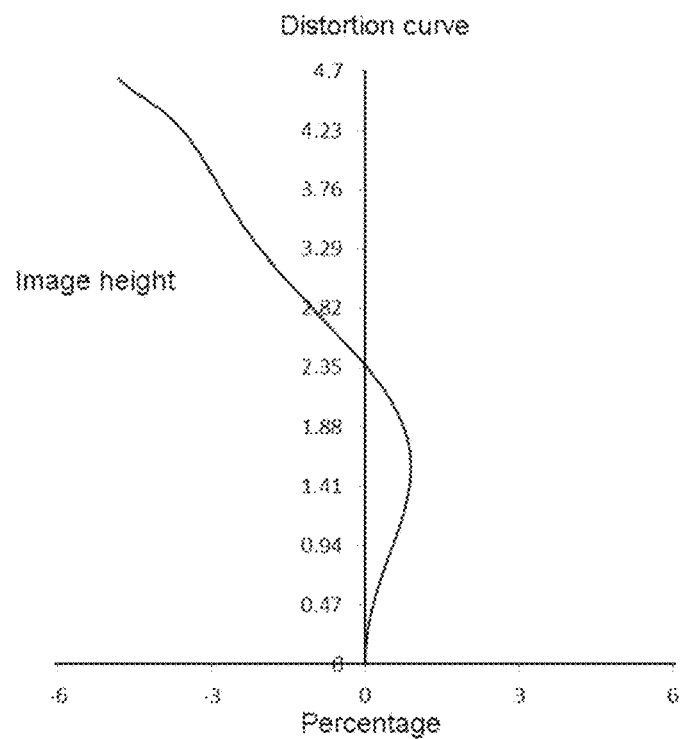

FIG. 10A illustrates a longitudinal aberration curve of the optical imaging lens assembly in Embodiment 5, which represents that a convergence focus of light rays of different wavelengths is deviated after the light rays pass through the lens. FIG. 10B illustrates an astigmatism curve of the optical imaging lens assembly of Embodiment 5, which represents a curvature of tangential image surface and a curvature of sagittal image surface. FIG. 10C illustrates a distortion curve of the optical imaging lens assembly of Embodiment 5, which represents distortion magnitude values corresponding to different image heights. FIG. 10A to FIG. 10C illustrate that the optical imaging lens assembly provided in Embodiment 5 is capable of achieving good imaging quality.

Embodiment 6

Figure 11:
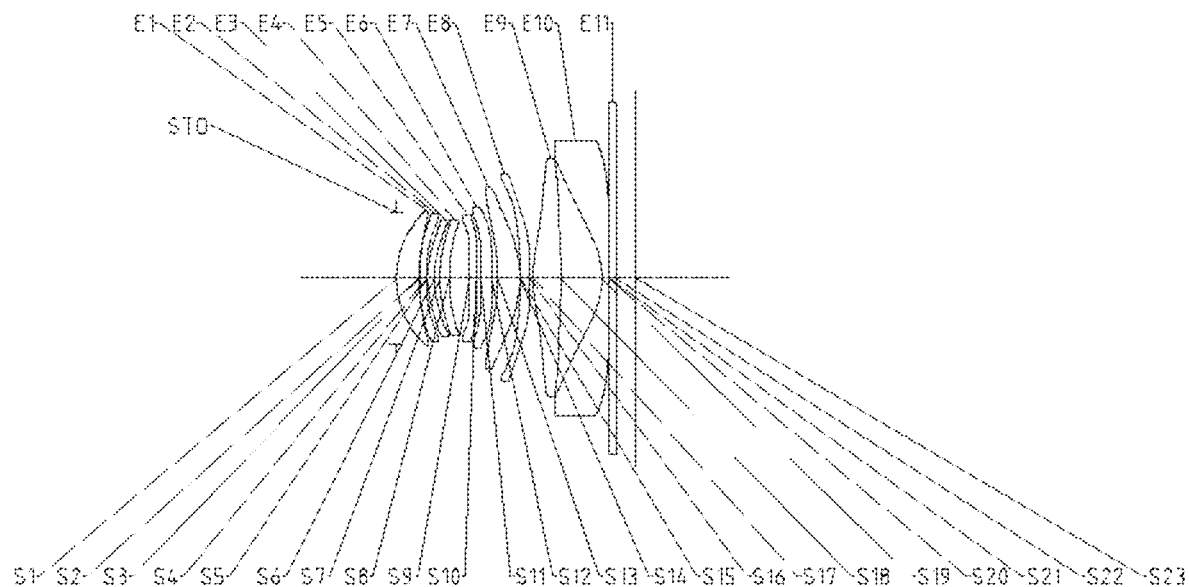
FIG. 11 illustrates a structural schematic diagram of an optical imaging lens assembly according to Embodiment 6 of the disclosure.

An optical imaging lens assembly according to Embodiment 6 of the disclosure is described below with reference to FIG. 11 to FIG. 12C. FIG. 11 shows a structural schematic diagram of an optical imaging lens assembly according to Embodiment 6 of the disclosure.

As shown in FIG. 11, the optical imaging lens assembly sequentially includes from an object side to an image side: a diaphragm STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging surface S23.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a concave surface. The fifth lens E5 has a negative refractive power, an object-side surface S9 thereof is a convex surface, and an image-side surface S10 thereof is a concave surface. The sixth lens E6 has a positive refractive power, an object-side surface S11 thereof is a convex surface, and an image-side surface S12 thereof is a concave surface. The seventh lens E7 has a positive refractive power, an object-side surface S13 thereof is a concave surface, and an image-side surface S14 thereof is a convex surface. The eighth lens E8 has a negative refractive power, an object-side surface S15 thereof is a concave surface, and an image-side surface S16 thereof is a convex surface. The ninth lens E9 has a positive refractive power, an object-side surface S17 thereof is a convex surface, and an image-side surface S18 thereof is a convex surface. The tenth lens E10 has a negative refractive power, an object-side surface S19 thereof is a concave surface, and an image-side surface S20 thereof is a concave surface. The optical filter E11 has an object-side surface S21 and an image-side surface S22. Light from an object sequentially passes through each of the surfaces from S1 to S22 and is finally imaged on the imaging surface S23.

In this embodiment, f is a total effective focal length of the optical imaging lens assembly, f equals 5.40 mm, TTL is a total length of the optical imaging lens assembly, TTL equals 7.58 mm, and ImgH is a half of a diagonal length of an effective pixel region on the imaging surface S23, ImgH equals 4.75 mm.

Table 11 illustrates a table of basic parameters of the optical imaging lens assembly of Embodiment 6, wherein the units of the curvature radius, thickness/distance, and focal length are all millimeters (mm). Table 12 illustrates high order term coefficients applicable to various aspheric mirror surfaces in Embodiment 6, wherein shapes of various aspheric surfaces may be defined by the formula (1) provided in above-mentioned Embodiment 1.

TABLE 11

| Surface number | Surface type | Curvature radius | Thickness/ distance | Material Refractive index | Abbe number | Focal length | Conic coefficient |
|---|---|---|---|---|---|---|---|
| OBJ | Spherical | Infinity | Infinity | | | | |
| STO | Spherical | Infinity | 0.0200 | | | | |
| S1 | Aspheric | 2.9310 | 0.7063 | 1.55 | 50.3 | 12.60 | 0.0000 |
| S2 | Aspheric | 4.6276 | 0.0335 | | | | 0.0000 |
| S3 | Aspheric | 14.8036 | 0.2100 | 1.66 | 19.7 | −19543.60 | 0.0000 |
| S4 | Aspheric | 14.7029 | 0.0261 | | | | 0.0000 |
| S5 | Aspheric | 2.6506 | 0.2127 | 1.67 | 19.1 | 125.81 | 0.0000 |
| S6 | Aspheric | 2.6474 | 0.1811 | | | | 0.0000 |
| S7 | Aspheric | 4.5455 | 0.3002 | 1.62 | 24.3 | 32.18 | 0.0000 |
| S8 | Aspheric | 5.7174 | 0.6416 | | | | 0.0000 |
| S9 | Aspheric | 60.3094 | 0.2102 | 1.60 | 26.5 | −74.29 | 0.0000 |
| S10 | Aspheric | 25.7103 | 0.1460 | | | | 0.0000 |
| S11 | Aspheric | 16.7802 | 0.3415 | 1.62 | 24.6 | 2363.75 | 0.0000 |
| S12 | Aspheric | 16.8399 | 0.1933 | | | | 0.0000 |
| S13 | Aspheric | −6.6657 | 0.7025 | 1.65 | 20.9 | 10.27 | 0.0000 |
| S14 | Aspheric | −3.4876 | 0.0200 | | | | 0.0000 |
| S15 | Aspheric | −8.8742 | 0.2921 | 1.58 | 33.6 | −17.03 | 0.0000 |
| S16 | Aspheric | −81.8074 | 0.1055 | | | | 0.0000 |
| S17 | Aspheric | 4.3385 | 0.8920 | 1.59 | 30.1 | 5.26 | −1.0000 |
| S18 | Aspheric | −10.5127 | 1.2904 | | | | 0.0000 |
| S19 | Aspheric | −2.3826 | 0.2100 | 1.67 | 19.1 | −3.46 | −1.0000 |
| S20 | Aspheric | 114.3772 | 0.0200 | | | | 0.0000 |
| S21 | Spherical | Infinity | 0.2100 | 1.52 | 64.2 | | |
| S22 | Spherical | Infinity | 0.6400 | | | | |
| S23 | Spherical | Infinity | | | | | |

TABLE 12

| Surface number | A4 | A6 | A8 | A10 | A12 | A14 | A16 |
|---|---|---|---|---|---|---|---|
| S1 | −1.5781E−02 | 3.0146E−02 | −2.4083E−02 | 9.6277E−03 | −2.0295E−03 | 2.1609E−04 | −9.1697E−06 |
| S2 | −3.1159E−02 | 2.1559E−02 | −1.3103E−02 | 5.1669E−03 | −1.2169E−03 | 1.5526E−04 | −8.2522E−06 |
| S3 | 3.1701E−02 | 2.6895E−03 | −8.6344E−03 | 3.3597E−03 | −5.5097E−04 | 3.5031E−05 | −2.0590E−07 |
| S4 | 6.2005E−02 | −2.3378E−02 | 8.9925E−03 | −4.3606E−03 | 1.4180E−03 | −2.3985E−04 | 1.6214E−05 |
| S5 | −3.6954E−02 | 1.5987E−02 | 3.5394E−03 | −2.8348E−03 | 1.0945E−03 | −2.0590E−04 | 1.4782E−05 |
| S6 | −4.2170E−02 | 1.5140E−02 | −1.2159E−02 | 6.5369E−03 | −1.9410E−03 | 3.2780E−04 | −2.3969E−05 |
| S7 | 5.3545E−03 | −3.3834E−03 | 1.5885E−03 | −2.1002E−03 | 1.0362E−03 | −2.1425E−04 | 1.6904E−05 |
| S8 | 1.4274E−03 | 6.7676E−03 | −7.1425E−03 | 3.1076E−03 | −6.9694E−04 | 7.0278E−05 | −9.1000E−07 |
| S9 | 4.7753E−03 | −1.7289E−02 | 4.2197E−03 | −2.4646E−03 | 1.2940E−03 | −2.8379E−04 | 2.3248E−05 |
| S10 | 6.9684E−04 | −1.3801E−02 | 5.2321E−03 | −2.2259E−03 | 7.3779E−04 | −1.1708E−04 | 7.2215E−06 |
| S11 | −4.6032E−02 | 1.1606E−02 | 9.0020E−03 | −4.1551E−03 | 6.8299E−04 | −2.4290E−05 | −2.2776E−06 |
| S12 | −3.9605E−02 | 1.2871E−03 | 4.5575E−03 | −1.7333E−03 | 2.0036E−04 | 2.5679E−06 | −1.1403E−06 |
| S13 | −5.6215E−03 | 2.8943E−03 | −4.7018E−05 | −1.0046E−04 | 1.8297E−05 | −1.3283E−06 | 3.5314E−08 |
| S14 | 1.9173E−03 | 2.2800E−03 | −3.8096E−04 | 3.6634E−05 | 2.4265E−07 | −3.5396E−07 | 1.8975E−08 |
| S15 | 1.9457E−03 | −1.0419E−02 | 3.3074E−03 | −6.3197E−04 | 6.7481E−05 | −3.7402E−06 | 8.4706E−08 |
| S16 | −1.7541E−02 | −3.9873E−03 | 2.5299E−03 | −4.7645E−04 | 4.4494E−05 | −2.0944E−06 | 3.9589E−08 |
| S17 | −2.1799E−02 | 2.9916E−03 | −2.9974E−04 | 2.1922E−05 | −1.0616E−06 | 2.9876E−08 | −3.6640E−10 |
| S18 | 1.4755E−02 | −2.8230E−03 | 3.2921E−04 | −2.4718E−05 | 1.1264E−06 | −2.7718E−08 | 2.8071E−10 |
| S19 | 1.1774E−02 | −2.7530E−04 | 6.4632E−05 | −1.7672E−05 | 1.7314E−06 | −7.4739E−08 | 1.2044E−09 |
| S20 | −7.3739E−04 | −7.8574E−05 | 7.9902E−06 | −5.5039E−07 | 1.8245E−08 | −2.5496E−10 | 1.0873E−12 |

Figure 12A:
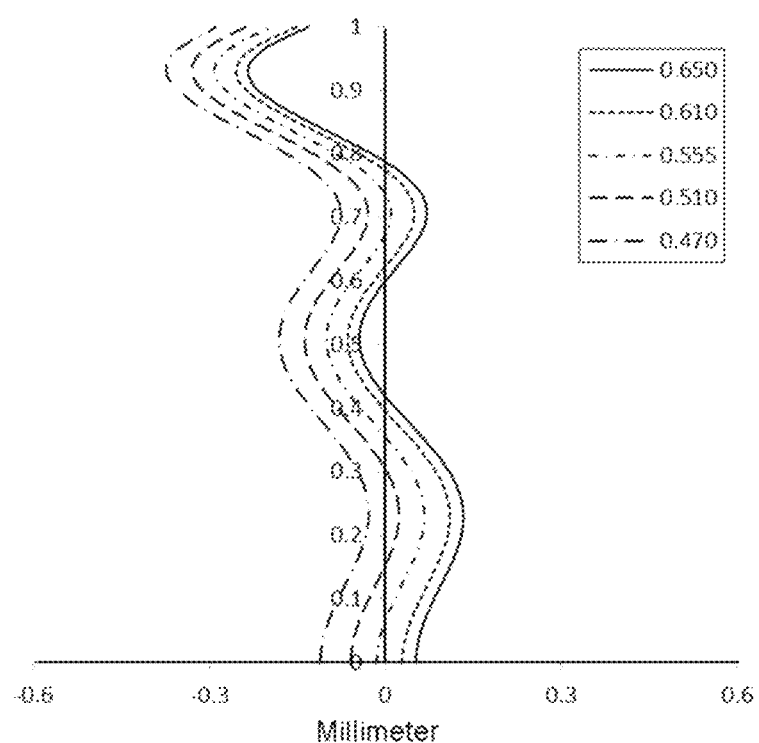
FIGS. 12A-12C illustrate a longitudinal aberration curve, an astigmatism curve and a distortion curve of the optical imaging lens assembly in Embodiment 6 respectively.
Figure 12B:
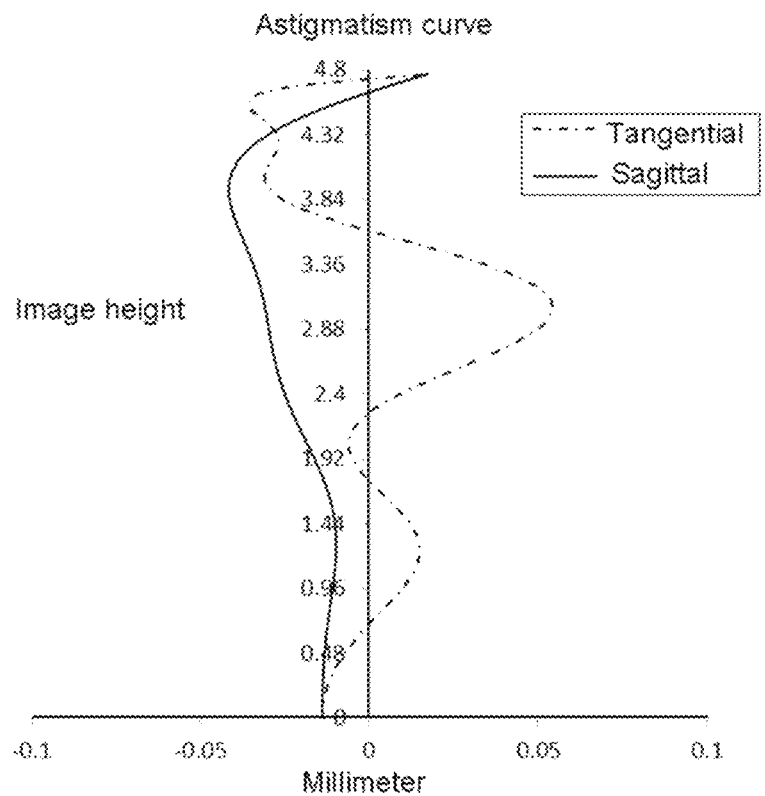
Figure 12C:
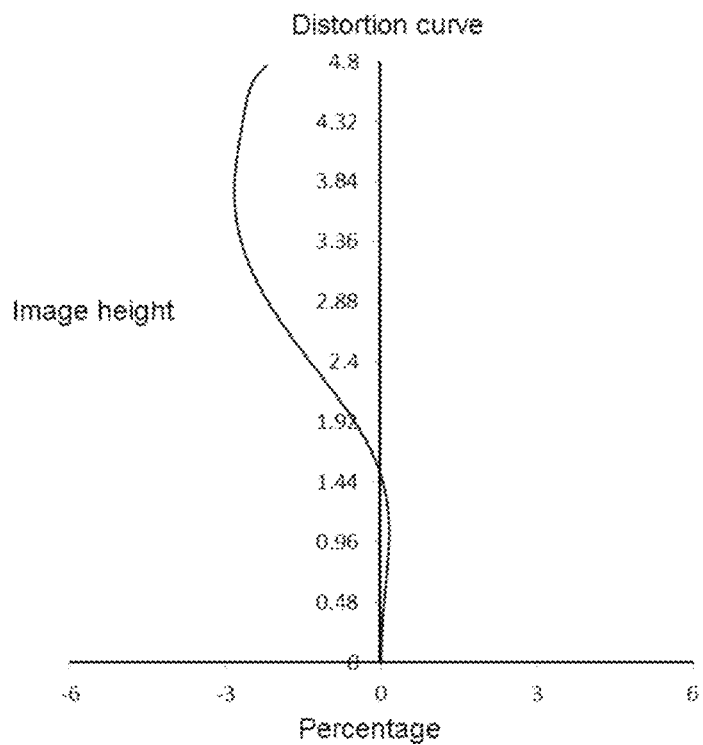

FIG. 12A shows a longitudinal aberration curve of the optical imaging lens assembly in Embodiment 6, which represents that after light rays of different wavelengths pass through the lens, a convergence focus is deviated. FIG. 12B shows an astigmatism curve of the optical imaging lens assembly of Embodiment 6, which represents a curvature of tangential image surface and a curvature of sagittal image surface. FIG. 12C illustrates a distortion curve of the optical imaging lens assembly of Embodiment 6, which represents distortion magnitude values corresponding to different image heights. FIG. 12A to FIG. 12C illustrate that the optical imaging lens assembly provided in Embodiment 6 is capable of achieving good imaging quality.

To summarize, Embodiment 1-6 separately satisfy relations shown in Table 13.

TABLE 13

| Conditional expression | embodiment | | | | | |
|---|---|---|---|---|---|---|
| | 1 | 2 | 3 | 4 | 5 | 6 |
| f/EPD | 1.30 | 1.47 | 1.32 | 1.28 | 1.30 | 1.30 |
| f1/f3* 10 | 0.75 | 0.84 | 2.76 | 0.98 | 3.63 | 1.00 |
| f7/(R14 − R13) | 0.81 | 0.75 | 1.33 | 0.56 | 1.28 | 3.23 |
| f9/R17 | 1.27 | 1.31 | 1.34 | 1.27 | 1.31 | 1.21 |
| f8/f10 | 2.84 | 2.91 | 5.20 | 4.69 | 4.85 | 4.93 |
| F * tan (FOV/2) (mm) | 4.90 | 5.56 | 4.94 | 4.76 | 4.87 | 4.86 |
| CT9/CT7 | 1.61 | 1.48 | 1.48 | 1.36 | 1.47 | 1.27 |
| T910/T45 | 2.14 | 2.58 | 2.38 | 2.02 | 2.24 | 2.01 |
| f12/f | 2.36 | 2.33 | 2.28 | 2.41 | 2.27 | 2.32 |
| f1234/(CT1 + CT2 + CT3 + CT4) | 5.86 | 5.69 | 6.49 | 6.09 | 6.03 | 5.96 |
| f78/f56 | −1.24 | −1.33 | −0.74 | −0.90 | −0.73 | −0.36 |
| SAG31/SAG41 | 1.32 | 1.38 | 1.38 | 1.33 | 1.40 | 1.34 |

The disclosure also provides an imaging device, wherein the electronic photosensitive element may be a Charge Coupled Device (CCD) or a Complementary Metal Oxide Semiconductor (CMOS). The imaging device may be a stand-alone imaging device, such as a digital camera, or an imaging module integrated on mobile electronic equipment, such as a cell phone. The imaging device is equipped with the optical imaging lens assembly described above.

The above description is only description about the preferred embodiments of the disclosure and adopted technical principles. It should be understood by those skilled in the art that the scope of the inventions involved in the disclosure is not limited to the technical solution formed by a specific combination of the above-mentioned technical features, and should also cover other technical solutions formed by any combination of the above-mentioned technical features or equivalent features without departing from the inventive concept, for example, the technical solution formed by replacing the above-mentioned features with the technical features with similar functions disclosed in (but not limited to) the disclosure or vice versa.

What is claimed is:

1. An optical imaging lens assembly with ten lenses, sequentially comprising from an object side to an image side along an optical axis: a first lens, a second lens, a third lens, a fourth lens, a fifth lens, a sixth lens, a seventh lens, an eighth lens, a ninth lens and a tenth lens having refractive powers respectively; wherein
the first lens, the third lens, the seventh lens and the ninth lens have positive refractive powers respectively;
the second lens, the eighth lens and the tenth lens have negative refractive powers respectively;
the fourth lens, the fifth lens and the sixth lens have positive or negative refractive powers respectively; and
f is a total effective focal length of the optical imaging lens assembly and EPD is an entrance pupil diameter of the optical imaging lens assembly, f and EPD satisfy: f/EPD<1.5;
f78 is a combined focal length of the seventh lens and the eighth lens, and f56 is a combined focal length of the fifth lens and the sixth lens, f78 and f56 satisfy: −1.5<f78/f56<−0.3.

2. The optical imaging lens assembly with ten lenses as claimed in claim 1, wherein f1 is an effective focal length of the first lens, and f3 is an effective focal length of the third lens, f1 and f3 satisfy: 0.7<(f1/f3)*10<3.7.

3. The optical imaging lens assembly with ten lenses as claimed in claim 1, wherein f7 is an effective focal length of the seventh lens, R13 is a curvature radius of an object-side surface of the seventh lens, and R14 is a curvature radius of an image-side surface of the seventh lens, f7, R13 and R14 satisfy: 0.5<f7/(R14−R13)<3.3.

4. The optical imaging lens assembly with ten lenses as claimed in claim 1, wherein f9 is an effective focal length of the ninth lens, and R17 is a curvature radius of an object-side surface of the ninth lens, f9 and R17 satisfy: 1.0<f9/R17<1.5.

5. The optical imaging lens assembly with ten lenses as claimed in claim 1, wherein f8 is an effective focal length of the eighth lens, and f10 is an effective focal length of the tenth lens, f8 and f10 satisfy: 2.8<f8/f10<5.3.

6. The optical imaging lens assembly with ten lenses as claimed in claim 1, wherein CT9 is a center thickness of the ninth lens on the optical axis, and CT7 is a center thickness of the seventh lens on the optical axis, CT9 and CT7 satisfy: 1.2<CT9/CT7<1.7.

7. The optical imaging lens assembly with ten lenses as claimed in claim 1, wherein T910 is a spacing distance between the ninth lens and the tenth lens on the optical axis, and T45 is a spacing distance between the fourth lens and the fifth lens on the optical axis, T910 and T45 satisfy: 2.0<T910/T45<2.6.

8. The optical imaging lens assembly with ten lenses as claimed in claim 1, wherein f12 is a combined focal length of the first lens and the second lens, f12 and f satisfy: 2.0<f12/f<2.5.

9. The optical imaging lens assembly with ten lenses as claimed in claim 1, wherein f1234 is a combined focal length of the first lens, the second lens, the third lens and the fourth lens, CT1 is a center thickness of the first lens on the optical axis, CT2 is a center thickness of the second lens on the optical axis, CT3 is a center thickness of the third lens on the optical axis, and CT4 is a center thickness of the fourth lens on the optical axis, f1234, CT1, CT2, CT3 and CT4 satisfy: 5.0<f1234/(CT1+CT2+CT3+CT4)<7.0.

10. The optical imaging lens assembly with ten lenses as claimed in claim 1, wherein FOV is a maximum field of view of the optical imaging lens assembly, f and FOV satisfy: 4.5 mm<f*tan(FOV/2)<7.0 mm.

11. The optical imaging lens assembly with ten lenses as claimed in claim 1, wherein a spacing distance is provided on the optical axis between any two adjacent lenses from the first lens to the tenth lens.

12. The optical imaging lens assembly with ten lenses as claimed in claim 1, wherein an object-side surface of the third lens is a convex surface, and an image-side surface is a concave surface; and an object-side surface of the fourth lens is a convex surface, and an image-side surface is a concave surface.

13. An optical imaging lens assembly with ten lenses, sequentially comprising from an object side to an image side along an optical axis: a first lens, a second lens, a third lens, a fourth lens, a fifth lens, a sixth lens, a seventh lens, an eighth lens, a ninth lens and a tenth lens having refractive powers respectively; wherein the first lens, the third lens, the seventh lens and the ninth lens have positive refractive powers respectively;

the second lens, the eighth lens and the tenth lens have negative refractive powers respectively;

the fourth lens, the fifth lens and the sixth lens have positive or negative refractive powers respectively; and f is a total effective focal length of the optical imaging lens assembly and FOV is a maximum field of view of the optical imaging lens assembly, f and FOV satisfy: $4.5 \text{ mm} < f*\tan(FOV/2) < 7.0 \text{ mm}$;

f78 is a combined focal length of the seventh lens and the eighth lens, and f56 is a combined focal length of the fifth lens and the sixth lens, f78 and f56 satisfy: $-1.5 < f78/f56 < -0.3$.

14. The optical imaging lens assembly with ten lenses as claimed in claim 13, wherein f1 is an effective focal length of the first lens, and f3 is an effective focal length of the third lens, f1 and f3 satisfy: $0.7 < (f1/f3)*10 < 3.7$.

15. The optical imaging lens assembly with ten lenses as claimed in claim 13, wherein f7 is an effective focal length of the seventh lens, R13 is a curvature radius of an object-side surface of the seventh lens, and R14 is a curvature radius of an image-side surface of the seventh lens, f7, R13 and R14 satisfy: $0.5 < f7/(R14-R13) < 3.3$.

16. The optical imaging lens assembly with ten lenses as claimed in claim 13, wherein f9 is an effective focal length of the ninth lens, and R17 is a curvature radius of an object-side surface of the ninth lens, f9 and R17 satisfy: $1.0 < f9/R17 < 1.5$.

17. The optical imaging lens assembly with ten lenses as claimed in claim 13, wherein f8 is an effective focal length of the eighth lens, and f10 is an effective focal length of the tenth lens, f8 and f10 satisfy: $2.8 < f8/f10 < 5.3$.

18. The optical imaging lens assembly with ten lenses as claimed in claim 13, wherein CT9 is a center thickness of the ninth lens on the optical axis, and CT7 is a center thickness of the seventh lens on the optical axis, CT9 and CT7 satisfy: $1.2 < CT9/CT7 < 1.7$.

\* \* \* \* \*